(12) United States Patent
McQuade et al.

(10) Patent No.: US 8,914,184 B2
(45) Date of Patent: Dec. 16, 2014

(54) METHOD AND APPARATUS FOR MATCHING VEHICLE ECU PROGRAMMING TO CURRENT VEHICLE OPERATING CONDITIONS

(71) Applicant: Zonar Systems, Inc., Seattle, WA (US)

(72) Inventors: Charles Michael McQuade, Issaquah, WA (US); Bryan Hunt, Seattle, WA (US); Dan Mayer, Hobart, WA (US)

(73) Assignee: Zonar Systems, Inc., Seattle, WA (US)

( * ) Notice: Subject to any disclaimer, the term of this patent is extended or adjusted under 35 U.S.C. 154(b) by 0 days.

(21) Appl. No.: 13/854,919

(22) Filed: Apr. 1, 2013

(65) Prior Publication Data

US 2013/0261874 A1 Oct. 3, 2013

Related U.S. Application Data

(60) Provisional application No. 61/618,827, filed on Apr. 1, 2012.

(51) Int. Cl.
| | |
|---|---|
| *G01M 17/00* | (2006.01) |
| *G06F 11/30* | (2006.01) |
| *G06F 3/00* | (2006.01) |
| *F02D 41/26* | (2006.01) |
| *G06F 17/00* | (2006.01) |
| *F02D 29/02* | (2006.01) |
| *F02D 41/24* | (2006.01) |

(52) U.S. Cl.
CPC ............... *G06F 17/00* (2013.01); *F02D 41/26* (2013.01); *F02D 2200/02* (2013.01); *F02D 2200/70* (2013.01); *F02D 29/02* (2013.01); *F02D 41/2487* (2013.01); *F02D 2200/50* (2013.01)
USPC ............................. 701/29.1; 702/183; 710/8

(58) Field of Classification Search
USPC ............ 701/29.1, 31.433, 41; 710/8; 702/183
See application file for complete search history.

(56) References Cited

U.S. PATENT DOCUMENTS

| | | | | |
|---|---|---|---|---|
| 5,711,712 | A  * | 1/1998 | Graf .............................. | 477/121 |
| 6,421,790 | B1 * | 7/2002 | Fruehling et al. ............... | 714/30 |
| 6,795,761 | B1 * | 9/2004 | Lee et al. ......................... | 701/41 |
| 7,590,768 | B2 * | 9/2009 | Gormley .......................... | 710/8 |
| 8,046,501 | B2 * | 10/2011 | Gormley ........................... | 710/8 |
| 8,185,293 | B2 * | 5/2012 | Jiang et al. ..................... | 701/102 |
| 8,204,634 | B2 * | 6/2012 | Schwarz et al. .................. | 701/1 |
| 8,219,796 | B2 * | 7/2012 | Weiberle et al. ............... | 713/100 |
| 8,560,996 | B1 * | 10/2013 | Brebner et al. ............... | 716/117 |
| 2007/0174683 | A1* | 7/2007 | Gehring et al. ................. | 714/12 |
| 2008/0269974 | A1* | 10/2008 | Schwarz et al. ............... | 701/29 |
| 2009/0240391 | A1* | 9/2009 | Duddle et al. .................. | 701/33 |

* cited by examiner

*Primary Examiner* — Thomas G Black
*Assistant Examiner* — Tyler Paige
(74) *Attorney, Agent, or Firm* — Michael C. King

(57) ABSTRACT

Disclosed herein are techniques for implementing vehicle ECU reprogramming, so the ECU programming, which plays a large role in vehicle performance characteristics, is tailored to current operational requirements, which may be different than the operational characteristics selected by the manufacturer when initially programming the vehicle ECU (or ECUs) with specific instruction sets, such as fuel maps. In one embodiment, a controller monitors the current operational characteristics of the vehicle, determines the current ECU programming, and determines if a different programming set would better suited to the current operating conditions. In the event that the current programming set should be replaced, the controller implements the ECU reprogramming. In a related embodiment, users are enabled to specify the ECU programming to change, such as changing speed limiter settings.

19 Claims, 16 Drawing Sheets

METHOD AND APPARATUS FOR MATCHING VEHICLE ECU PROGRAMMING TO CURRENT VEHICLE OPERATING CONDITIONS

RELATED APPLICATIONS

This application is based on a prior provisional application Ser. No. 61/618,827, filed on Apr. 1, 2012, the benefit of the filing date of which is hereby claimed under 35 U.S.C. §119 (e).

BACKGROUND

Modern vehicles are often equipped with sophisticated controllers that enable vehicle performance characteristics to be optimized for specific needs. An engine manufacturer may use different programming to logic to vary the engine performance characteristics, including horsepower delivered, according to the needs of a specific customer or class of customers. For example, trucks sold for use in over the road trucking, operating for most of their service life on highways, require different performance characteristics than similar trucks operating for most of their service life on city streets in stop-and-go traffic. A fuel map refers to a set of programming instructions that can be input into an engine control unit (an ECU) to modify performance characteristics of an engine.

As used herein and in the claims that follow, the term fuel map refers to a specific program (i.e., a set of machine instructions) used by an engine control unit (ECU) to determine how to respond to various sensor inputs (i.e., changes in driving conditions). The ECU generally responds to changing inputs by changing at least one of the following parameters: fuel flow rate, spark timing, and idle speed. Changing the fuel map (i.e., the instruction set used by the ECU) will change the performance characteristics of the engine. Manufacturers generally select a fuel map to provide satisfactory vehicle performance over a wide range of conditions.

Other ECU programming instructions sets can be used to modify other performance characteristics, such as maximum road speed, maximum RMP, maximum idle time, etc.

In general, modification of such programming instructions sets requires a replacement instruction set, a hardware interface to be coupled to a vehicle data port (enabling the instruction set to be sent to the appropriate ECU), and a software interface or software application to manage the replacement. Some third party vendors sells kits enabling vehicle owners to perform their own ECU reprogramming using a laptop and a custom hardware interface, programming set, and software application (generally the hardware interface, programming set, and software application are sold together as a kit). Otherwise, vehicle operators need to bring their vehicle to a mechanic to have such ECU reprogramming performed.

It would be desirable to provide vehicle operators with the ability to more readily implement ECU reprogramming. Fuel mapping and other performance related instructions set, customized to the specific performance requirements of a vehicle for a specific route or trip, may lead to more cost efficient operations.

SUMMARY

One aspect of the novel concepts presented herein is a method of enabling vehicle operators to more readily implement ECU reprogramming, so that the operator can tailor their vehicle's current ECU programming to current operational requirements, which may be different than the operational characteristics selected by the manufacturer when initially programming the vehicle ECU (or ECUs) with specific instruction sets, such as fuel maps.

In one embodiment, a controller monitors the current operational characteristics of the vehicle, determines the current ECU programming, and determines if a different programming set would be better suited to the current operating conditions. In the event that the current programming set should be replaced, the controller implements the ECU reprogramming. In at least one embodiment, that controller is at the vehicle, while in at least one other embodiment the controller is part of a remote computing system logically connected to the vehicle via a wireless data link.

Significantly, the monitoring of vehicle operational data (the term vehicle operational data includes, but is not limited to; vehicle speed, vehicle location, engine RPMs, engine load, vehicle mass, engine temperature, coolant temperature, engine oil temperature, brake temperature, tire pressure, tire temperature, and fuel use, noting that such parameters are exemplary and not limiting) is done in real-time, either via a controller at the vehicle or a controller remote from the vehicle (where operational data is conveyed from the vehicle to the remote controller in real-time). The term real-time as used herein and the claims that follow is not intended to imply the data is analyzed or transmitted instantaneously, rather the data is collected over a relatively short period of time (over a period of seconds or minutes), and analyzed (or transmitted to the remote computing device on an ongoing basis and analyzed) in a compressed time frame, as opposed to storing the data at the vehicle or remotely for an extended period of time (hour or days) before analysis.

In at least one embodiment, the vehicle is equipped with a position sensor, such as a Global Position System (GPS) device. A controller, either part of the GPS device or another controller at the vehicle uses GPS derived slope data to determine a vehicle's mass, and then uses the vehicle mass data to determine if the current vehicle ECU programming is appropriate. For example, a vehicle operating with a relatively light load may be operated more efficiently using a first set of ECU programming (i.e., a first fuel map), whereas a vehicle operating with a relatively heavy load may be operated more efficiently using a second set of ECU programming (i.e., a second fuel map). Using vehicle mass determined while the vehicle is operating based on GPS derived slope data represents one input that can be used to determine if current ECU programming is appropriate. In the event that the current programming set should be replaced, the controller implements the ECU reprogramming.

Fundamentally, GPS systems calculate velocity in three components (X, Y, Z or N/S, E/W, and Up/Down) based on a Doppler shift of the GPS satellite signals. Scalar speeds can then be calculated from those three components. For example, absolute speed or actual vehicle speed can be determined, as well as ground speed based on the shortest distance between two points (i.e., based on distance as the crow flies). Horizontal ground speed ($V_{HGS}$) can be calculated using the Pythagorean Theorem. To calculate a grade (G) the vehicle is traveling over (as a percentage), one can take the Z/Up magnitude and divide it by the horizontal ground speed. Replacing Z, x and y with directional vectors (such as Up for Z, West for x and North for y, recognizing that such directional vectors are exemplary, and may change based on the actual GPS data collected from the vehicle) enables one to calculate slope. The slope data is then used to determine the mass of the vehicle at that time. Pervious techniques to calculate mass use torque output, engine RPMs, and vehicle velocity to calculate a vehicle's mass or weight, but did not factor in slope, and thus are not accurate over routes including variable slopes (which most routes include). An improved mass metric (by including the GPS derived slope data in a mass calculation) enables a more accurate vehicle weight to be provided.

Note the calculation of vehicle mass using GPS derived slope data can be performed a plurality of times during a specific vehicle trip, and changes in the vehicle mass over time (due to partial unloading or fuel consumption) could trigger additional ECU reprogramming.

Another input that can be used by the controller monitoring the current vehicle ECU programming is vehicle load data entered into an input device by a driver of the vehicle. Such vehicle load data can be based on a vehicle weight provided by a scale, or can be made available on shipping documentation provided to the driver when picking up a load, or can be provided to the driver via a communication from a dispatcher, agent or customer having access to the data defining the load being picked up by the vehicle. The driver will use an input device to provide the vehicle load data to the controller, which then uses the vehicle load data to determine if the current vehicle ECU programming is appropriate. As noted above, using a different fuel map may result in more efficient vehicle operation when a fuel map is correlated to the actual load of the vehicle. Again, the controller will compare the current ECU programming to the loaded state of the vehicle and available ECU programming sets, and in the event that the current programming set should be replaced, the controller implements the ECU reprogramming.

Still another input that can be used by the controller monitoring the current vehicle ECU programming is vehicle load data entered into an input device by a dispatcher or agent at a location remote from the vehicle. In such a case, the controller needs to be coupled to the remote input via a wireless data link, so that vehicle load data input from a remote site can be conveyed to the controller at the vehicle. A GSM or other type of cellular modem can be employed as such a data link (noting that such a data link is exemplary, and not limiting, and other wireless data links, including satellite based data links, can also be employed). Such remotely input vehicle load data can be based on information provided to a dispatcher or broker coordinating transportation of a load by the vehicle in question. The controller uses the remotely input vehicle load data to determine if the current vehicle ECU programming is appropriate, generally as discussed above.

Still another input that can be used by the controller monitoring the current vehicle ECU programming is vehicle routing data. When a vehicle route is known in advance, an analysis of the route can be performed to optimize ECU programming parameters based on the route characteristics. For example, where a first portion of the route involves mountainous terrain, and a second portion of the route involves relatively flat terrain, a first set of ECU programming may provide more efficient vehicle operation for the first portion of the route, while a second set of ECU programming may provide more efficient vehicle operation for the second portion of the route. The analysis of the route and the selected ECU programming parameters may be based on empirical data collected during previous trips over the same route, or may be based on knowledge about the terrain, or combinations thereof. Particularly where a route is repeatedly traversed under similar load conditions, a carrier may vary ECU parameters on different trips while collecting empirical data, so the most efficient ECU parameters can be determined, and used for future trips. The controller at the vehicle tasked with ECU reprogramming can use ECU programming assigned to specific portions of the route, and GPS data collected during operation of the vehicle, to vary the ECU parameters based on the location of the vehicle.

In a related embodiment, the controller at the vehicle that monitors ECU programming states is logically coupled to a GPS device (or other position sensing system) in the vehicle, such that the controller changes the ECU programming based on the GPS location of the vehicle. Predefined ECU programming parameters can be assigned to downhill segments, to uphill segments, to specific altitudes, to relatively flat terrain, and to route segments where speed and heading may remain constant for extended periods (such as long stretches of highway).

It should be understood that in addition to GPS parameters, the controller determining which ECU programming parameters are appropriate for a vehicle based on current operational data inputs can also use other types of data input, such as ambient temperature, time, and date. For example, empirical data or user knowledge might indicate that a first set of ECU programming may lead to more efficient vehicle operation when the ambient temperature is relatively low, while a second set of ECU programming may lead to more efficient vehicle operation when the ambient temperature is relatively high. The ambient temperature can be measured by a sensor in the vehicle, or the ambient temperature can be estimated remotely and conveyed to the vehicle (such as by a weather reporting/predicting service). Similarly, empirical data or user knowledge might indicate that a first set of ECU programming may lead to more efficient vehicle operation during nighttime vehicle operation, while a second set of ECU programming may lead to more efficient vehicle operation during daylight vehicle operation. Daylight/nighttime conditions can be determined remotely and conveyed to the vehicle, or can be measured at the vehicle using light sensors and/or clocks. Similarly, empirical data or user knowledge might indicate that a first set of ECU programming may lead to more efficient vehicle operation during a first season (i.e., summer, fall, winter, spring), while a second set of ECU programming may lead to more efficient vehicle operation during a different season. The current season can be determined remotely and conveyed to the vehicle, or can be measured at the vehicle using a clock/calendar function.

Other operational data that can be used as an input for the controller tasked with reprogramming the vehicle ECU to enhance vehicle efficiency includes engine load (a parameter based in part on vehicle weight and engine RPMs), engine RPMs, engine oil temperature, engine coolant temperature, vehicle speed, transmission gear selection, vehicle weight, cruise control status, accessory device status (such as the use of supplementary cooling fans or power take off units). Different combinations and permeations of such inputs may change the optimal ECU programming selected by the controller. The assignment of optimal ECU programming sets to specific combinations of operation data inputs can be based on empirical data or user knowledge, as well as combinations thereof.

The status of a power take off unit is a special case that may significantly alter the ECU programming associated with optimal efficiency. For example, a power take off unit is used when the engine in the vehicle is not being used to generate horsepower to move the vehicle over the road, but rather to generate horsepower to be used by a mechanical or hydraulic accessory, or to generate electricity to drive an electrically energized accessory. Lift buckets, ladders, hoists are exemplary but not limiting types of accessory units associated with a power take off unit. Often the power required by such accessory units is much less than required for over the road operation, and such accessory components may be used for extended periods of time. Changing ECU programming to optimize efficiency can result in significant performance improvements in fuel consumption, particularly where required performance characteristics for over the road operation vary widely from the required performance characteristics for power take off operation. In some jurisdictions, PTO unit use may not trigger the same emission control requirements, such that it may be possible to bypass emission control systems during PTO, generally for enhanced fuel economy.

While fuel maps have been discussed above as a parameter that can be modified by ECU reprogramming, it should be understood that other parameters can also be modified in accord with the concepts disclosed herein. For example, ECU parameters controlling vehicle shifting patterns can be similarly modified. Different operational input conditions can result in changes to one or more ECU parameters, including but not limited to fuel maps and shift patterns.

In at least some embodiments, ECU programming changes can be done during vehicle operation. In other embodiments, a driver interface component is used to alert the driver that an ECU programming change is required, and the driver will be trained to respond to such an alert by pulling over at a safe location to shut down the vehicle (or idle the vehicle) while the programming change is carried out. Whether or not ECU programming changes are performed during active vehicle operation, vehicle shut done, or vehicle idle will sometimes be based on operator policy (some operators may demand such changes be done at idle or while the vehicle is shut down for safety reasons), and will sometimes be based on the design parameters of the specific ECU being reprogrammed.

In at least one embodiment, the ECU reprogramming is related to a vehicle speed limiter. Some jurisdictions have different speed laws. In such an embodiment, a driver or dispatcher can convey a command to the controller at the vehicle managing the ECU reprogramming to instruct a change in the speed limiter settings. Thus, if a driver (or dispatcher) knows the vehicle is approaching a locality with different speed rules, the driver (or dispatcher, via a remote data link) can instruct the controller to initiate such a change. For example, when a vehicle operating in the US enters Canada, failing to change the speed limiting settings can lead to a fine. Providing an owner/operator or driver with the ability to correct or change the settings when needed will aid in compliance, and reduce liability for drivers. In one related embodiment the driver will have the ability to make an ECU programming regarding speed limit settings by inputting a command in an input device in the vehicle, where the input device is coupled to the controller at the vehicle. In a related embodiment, a third party can remotely access the controller that is able to effect an ECU programming, and will effect such a programming change when requested to do so by a driver or dispatcher (the term dispatcher being intended to encompass any individual authorized to request such a change on behalf of the operator of a vehicle, regardless of their actual title or job duty). In an exemplary embodiment, the third party offers telematics services to the vehicle operator, such as GPS data collection and storage.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 3:
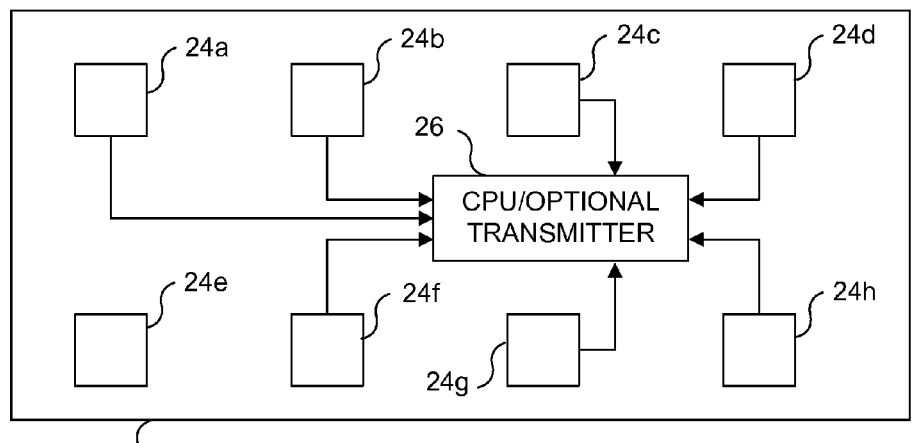
Figure 4A:
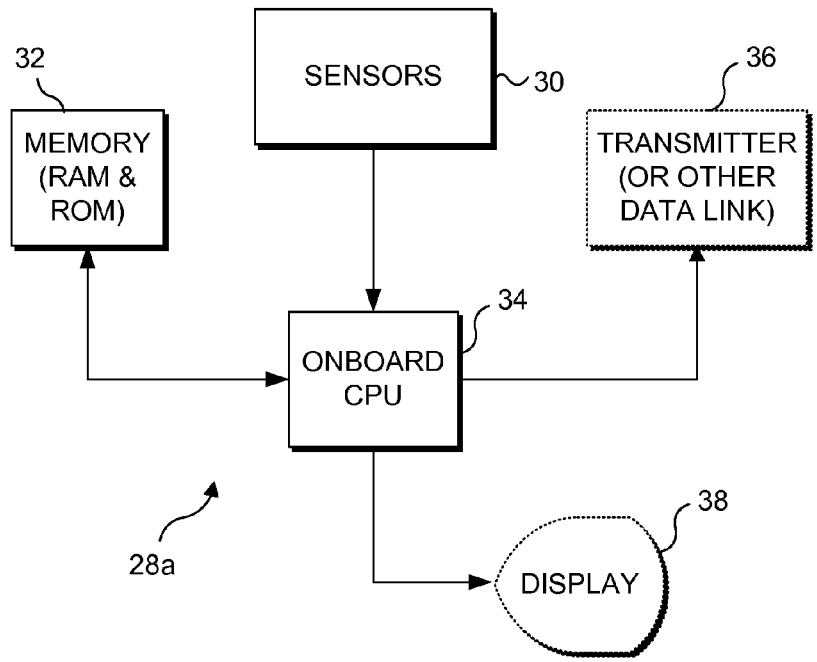
Figure 4B:
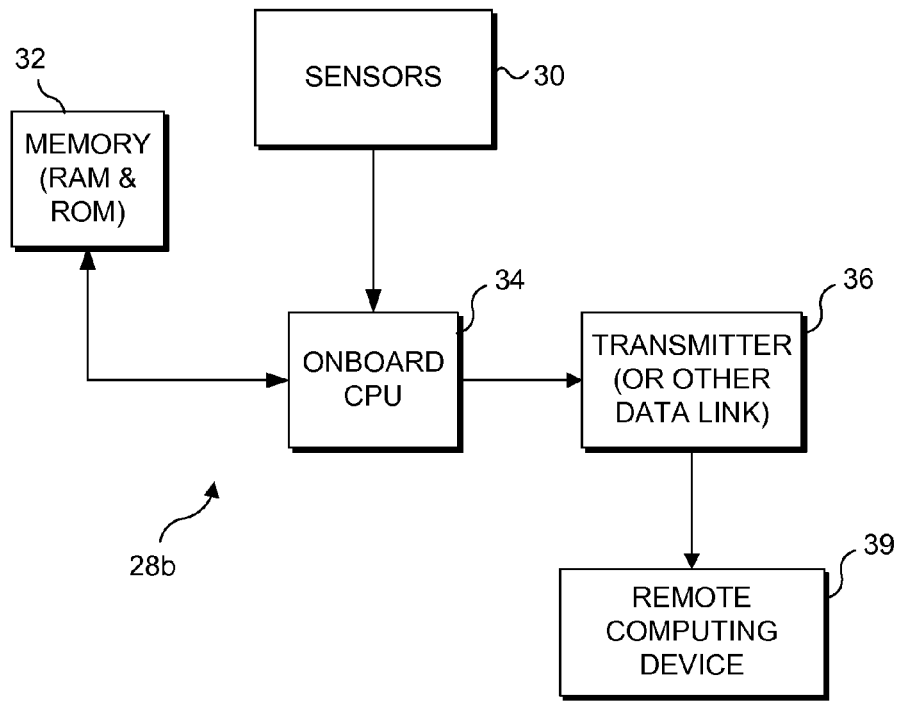
Figure 5:
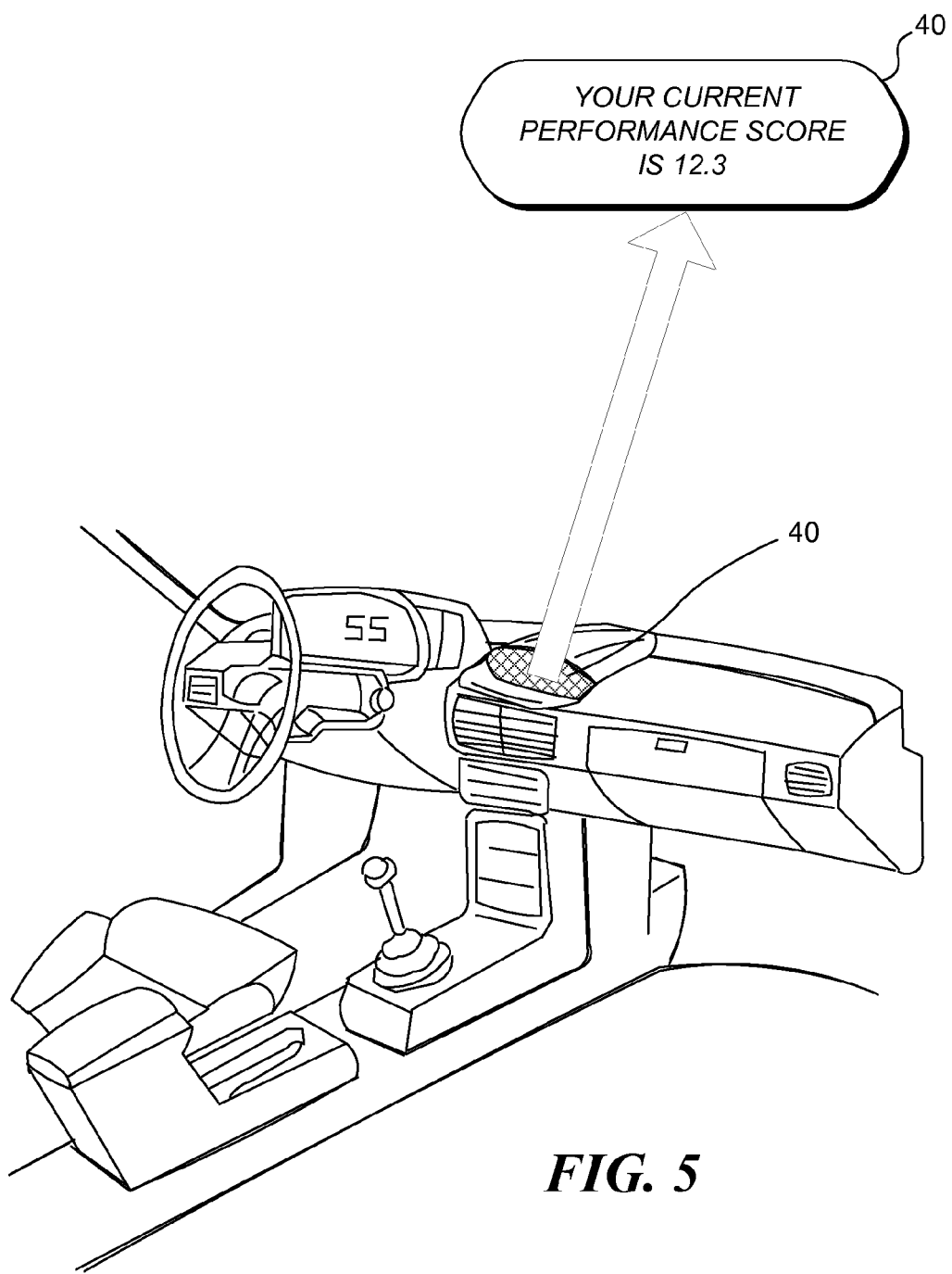
Figure 6:
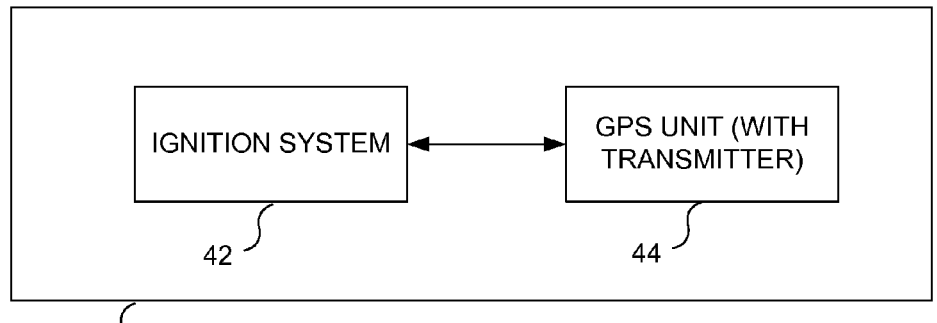
Figure 7:
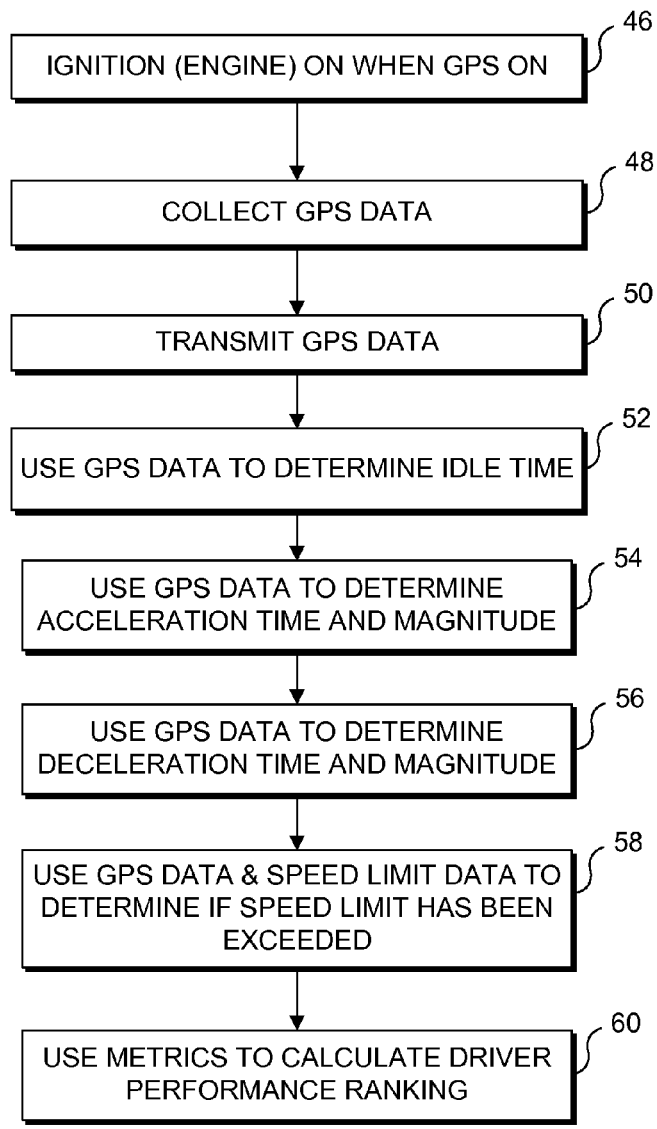
Figure 8:
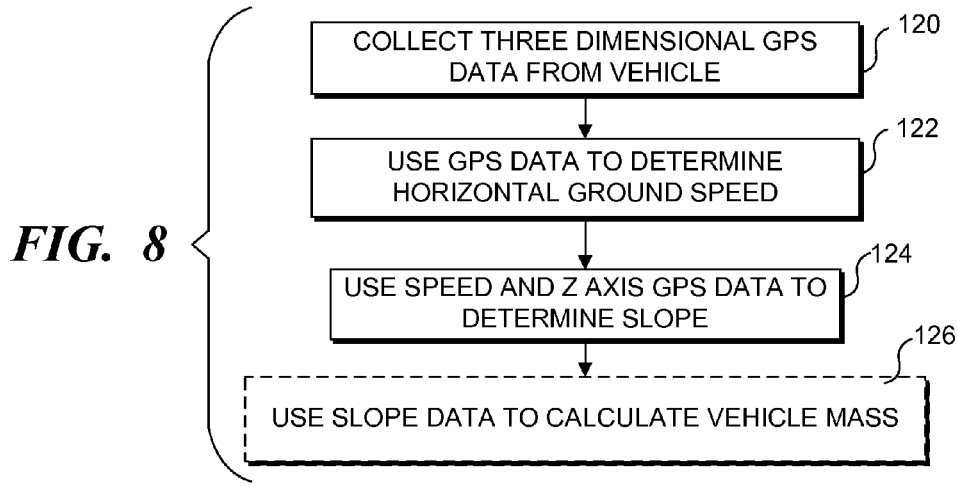
Figure 9:
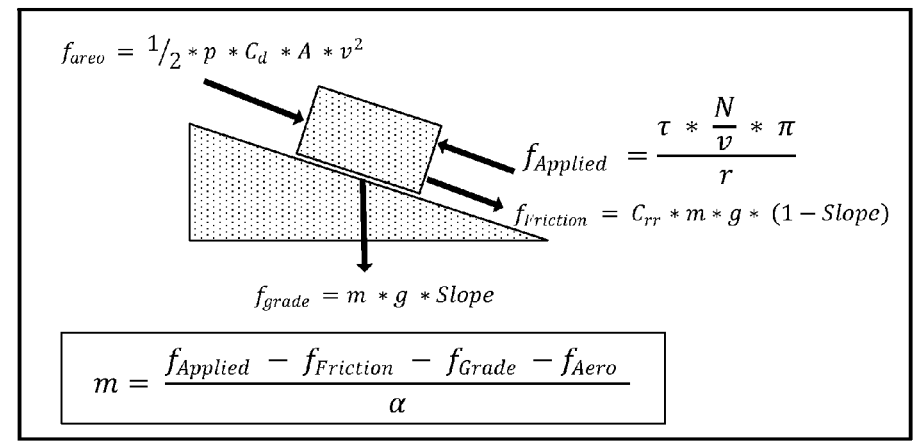
Figure 10:
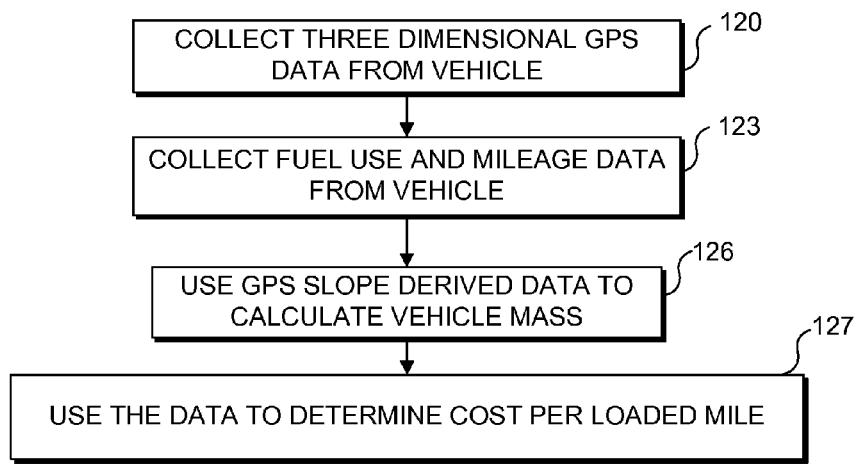
Figure 11A:
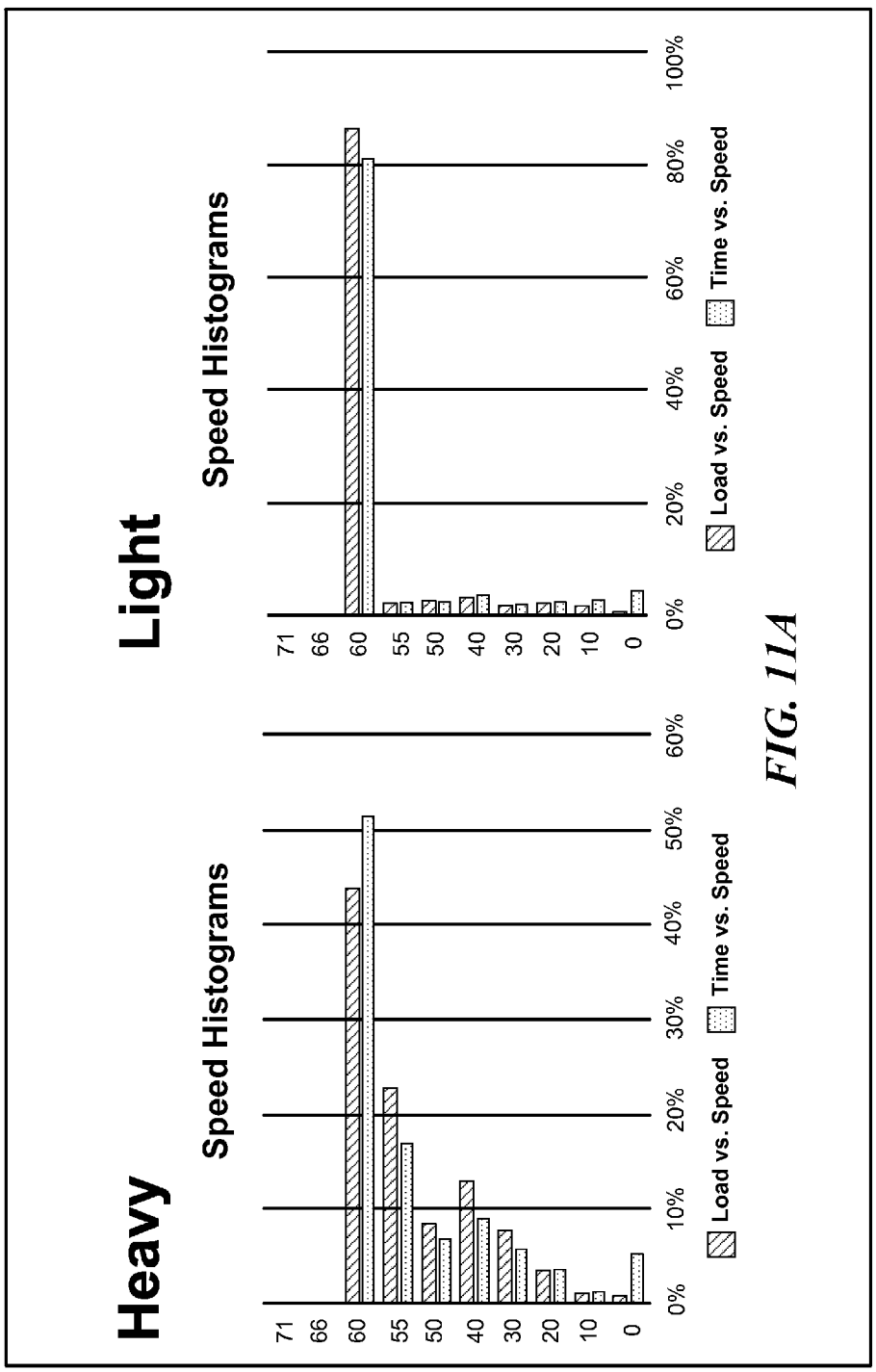
Figure 11B:
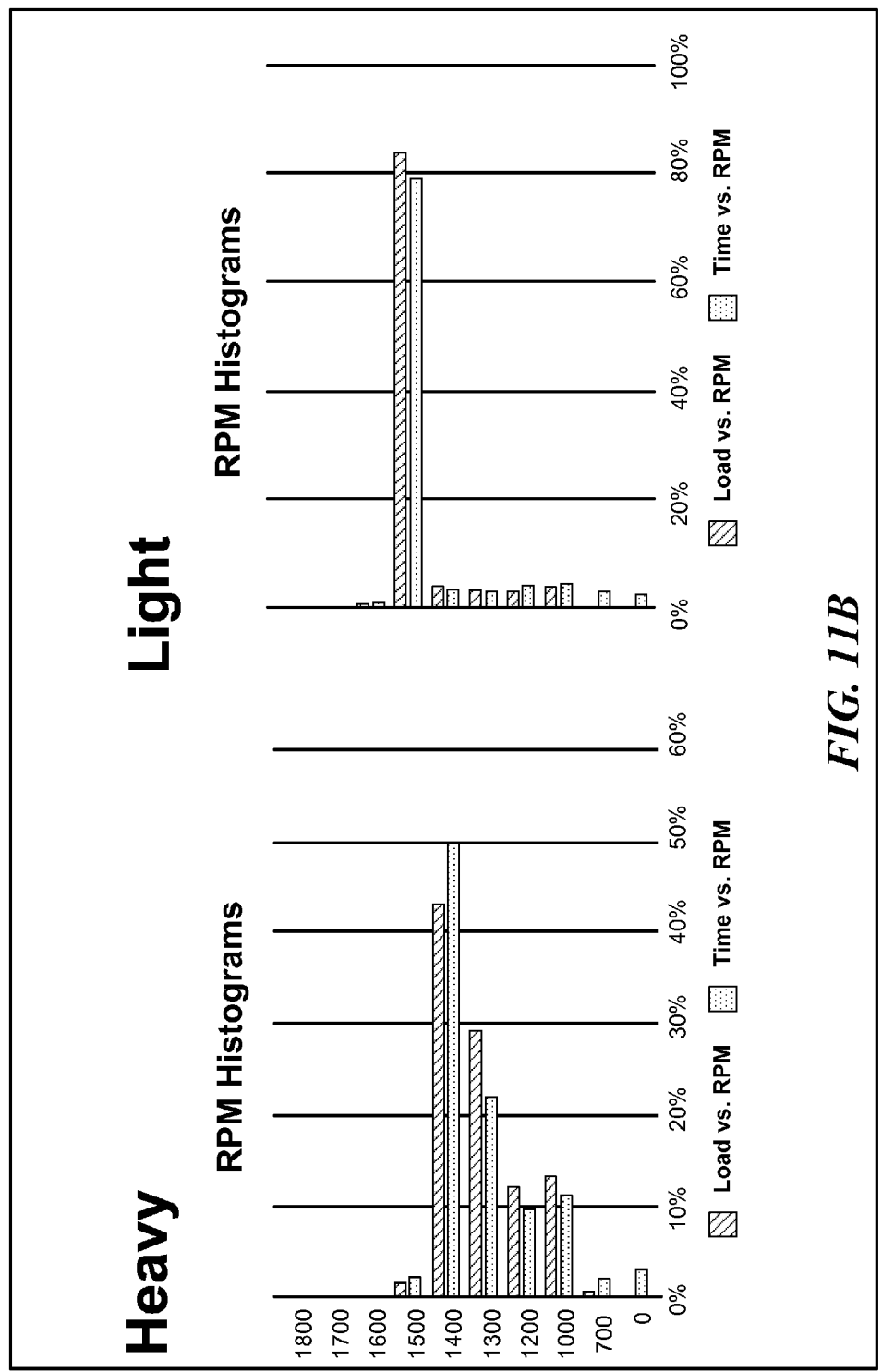
Figure 11C:
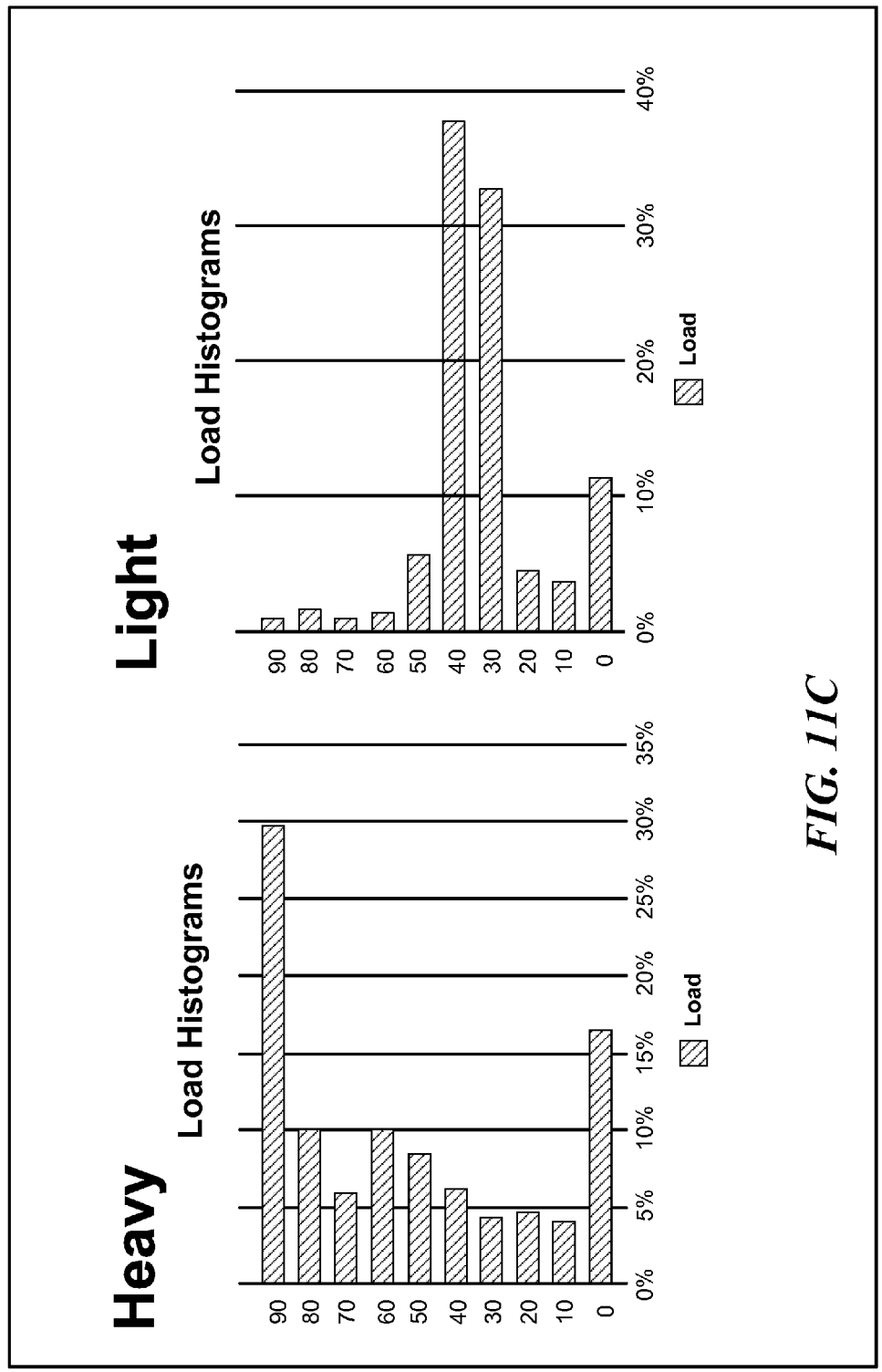
Figure 12A:
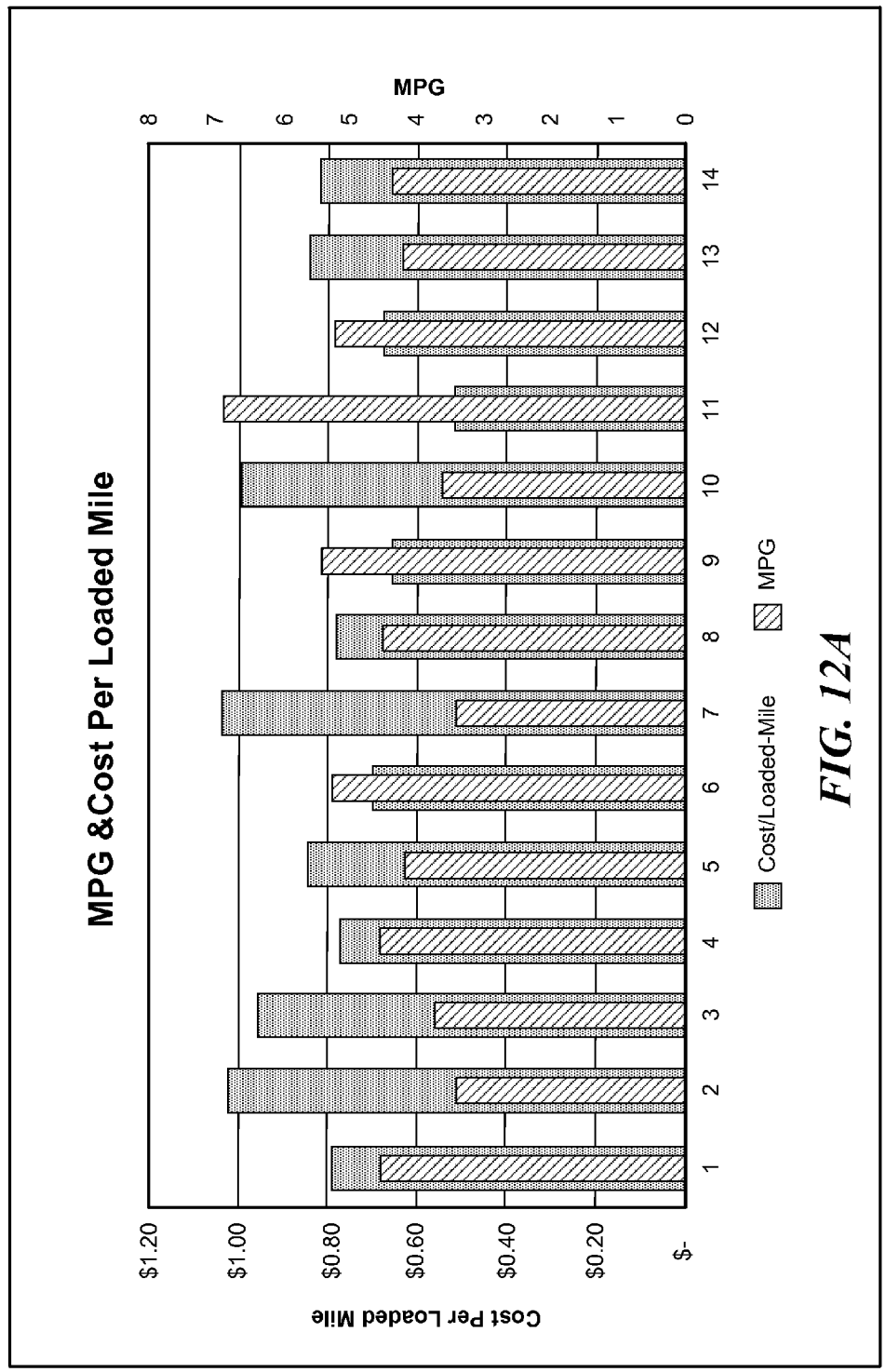
Figure 12B:
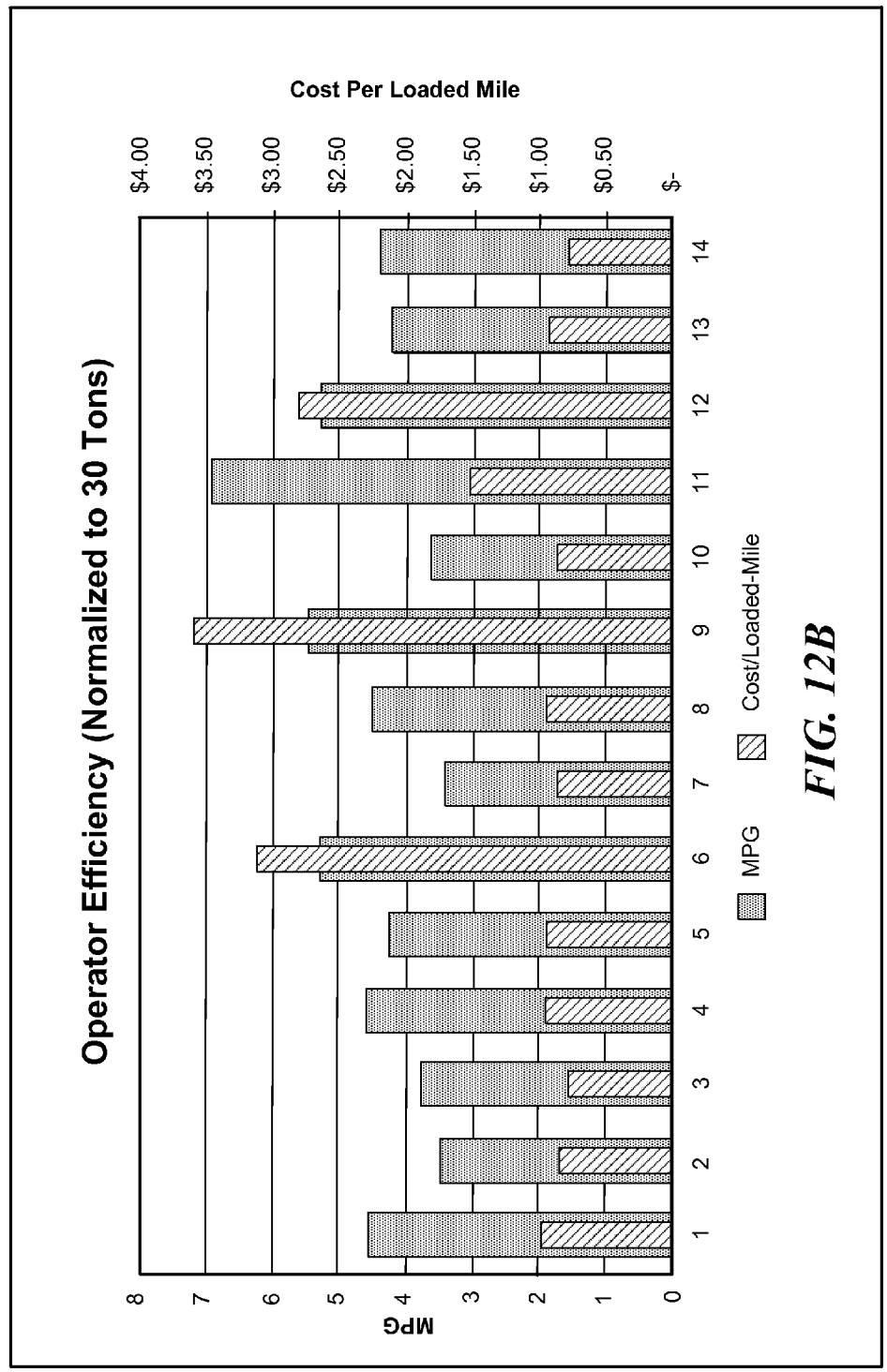
Figure 13:
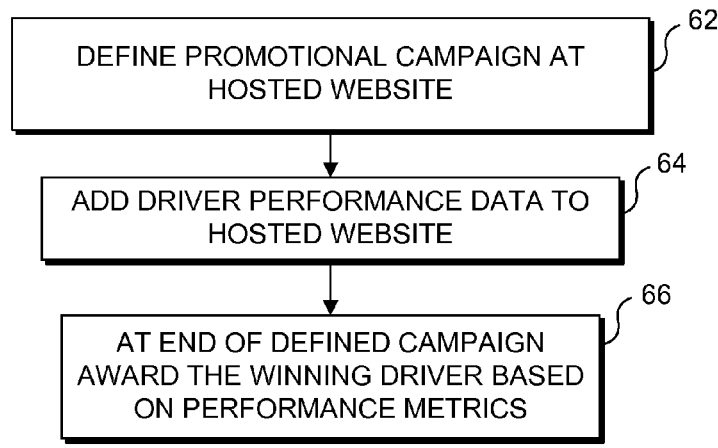
Figure 14:
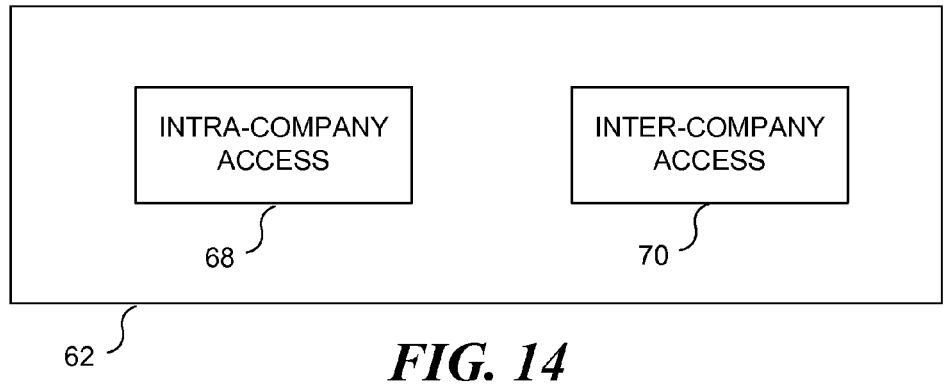
Figure 15:
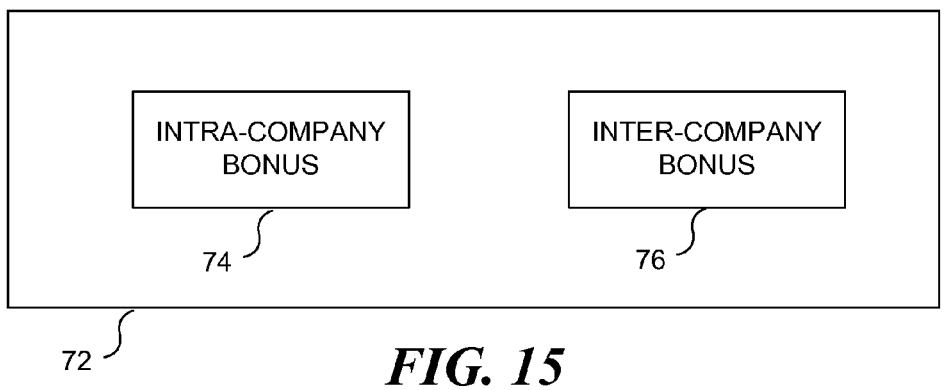
Figure 16:
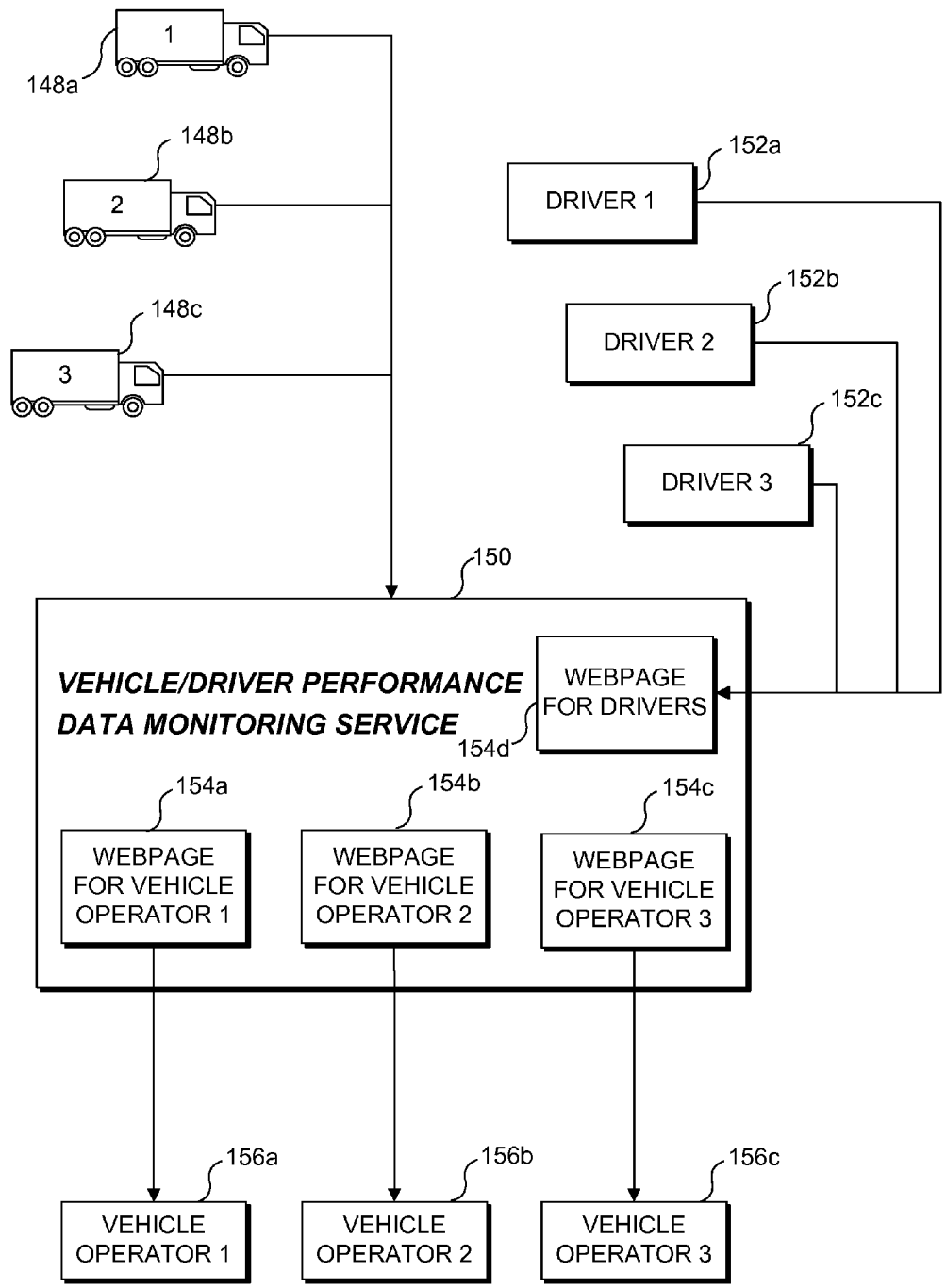
Figure 17:
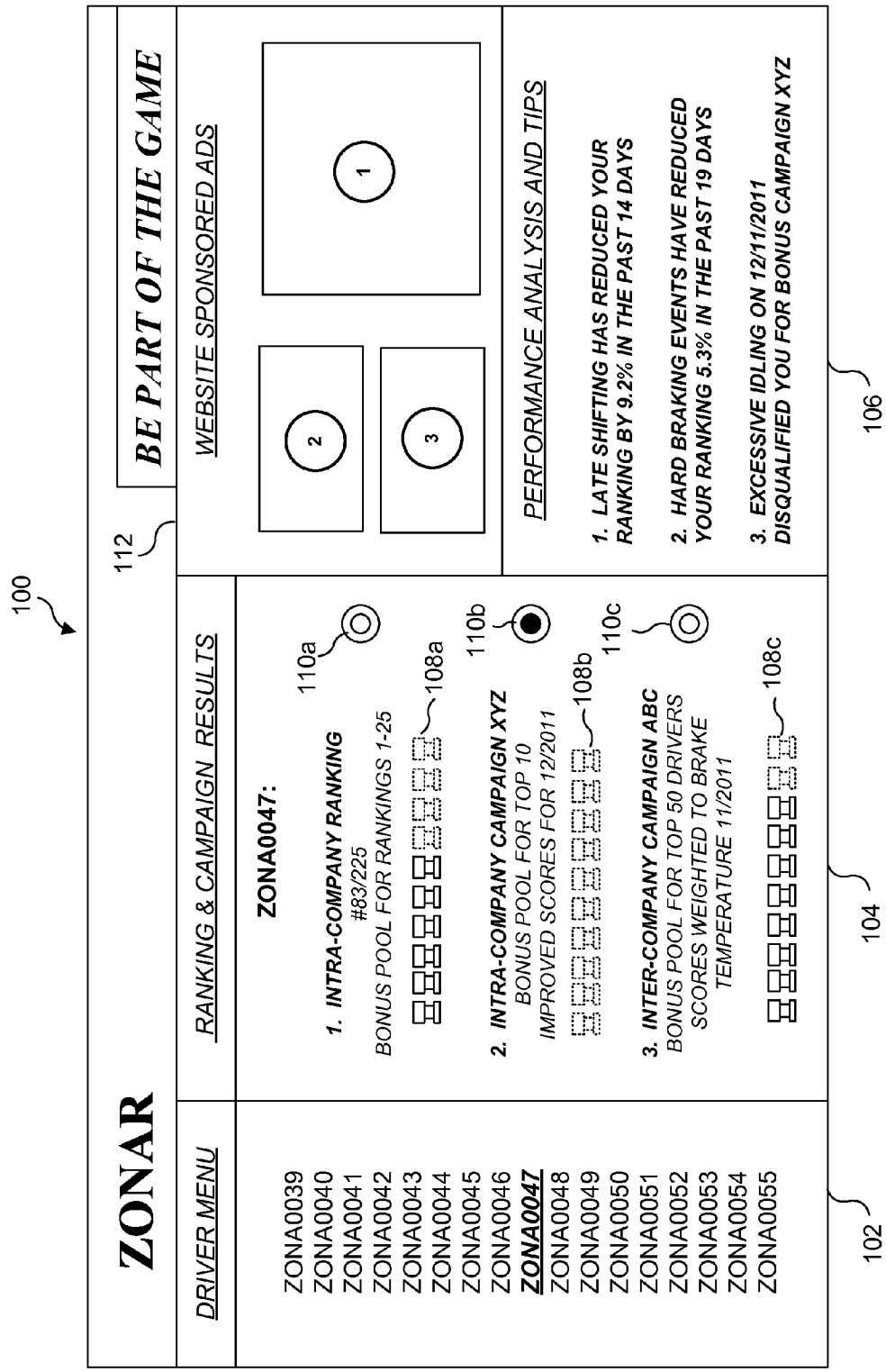
Figure 18:
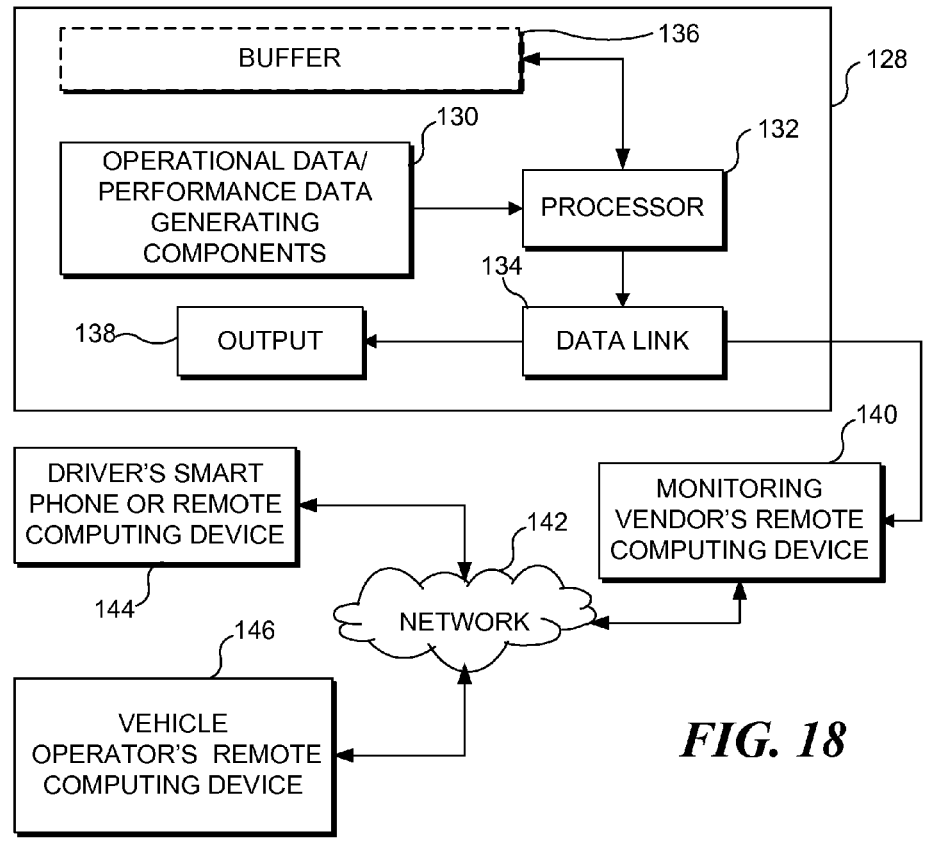
Figure 19:
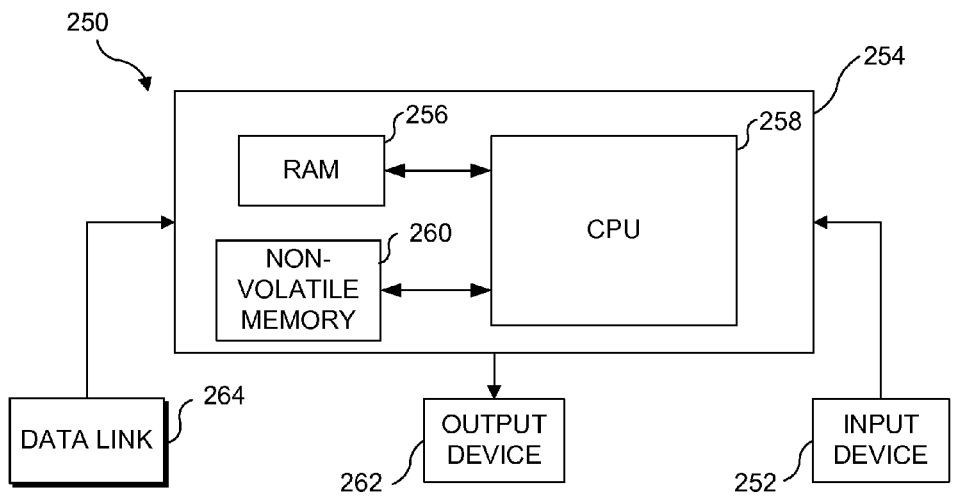
Figure 20:
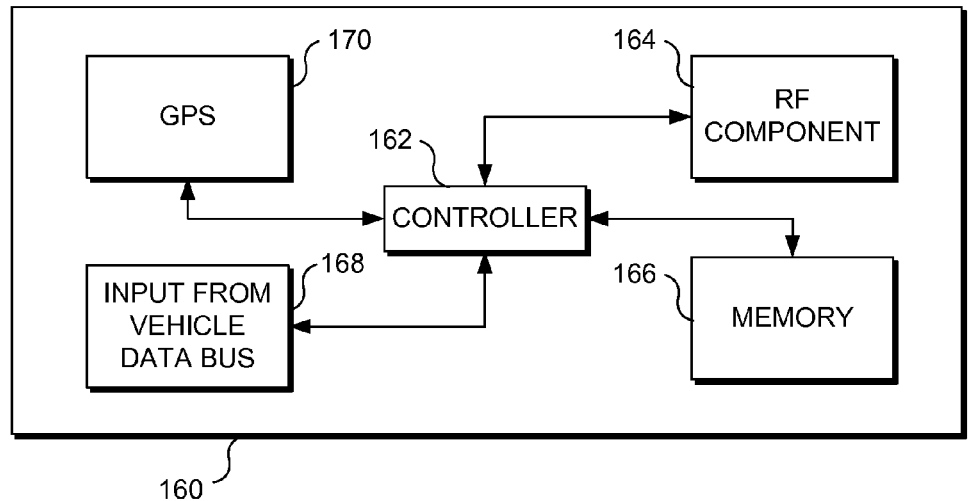
Figure 21:
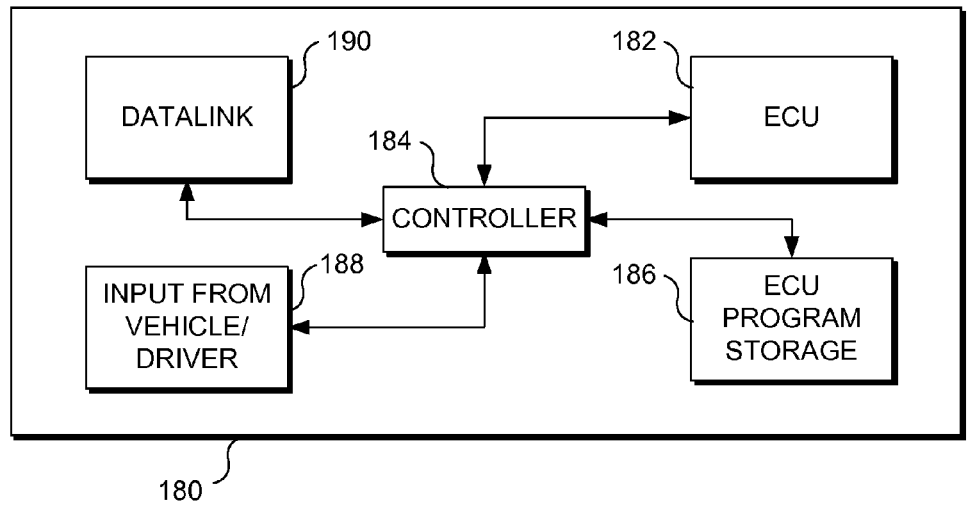
Figure 22:
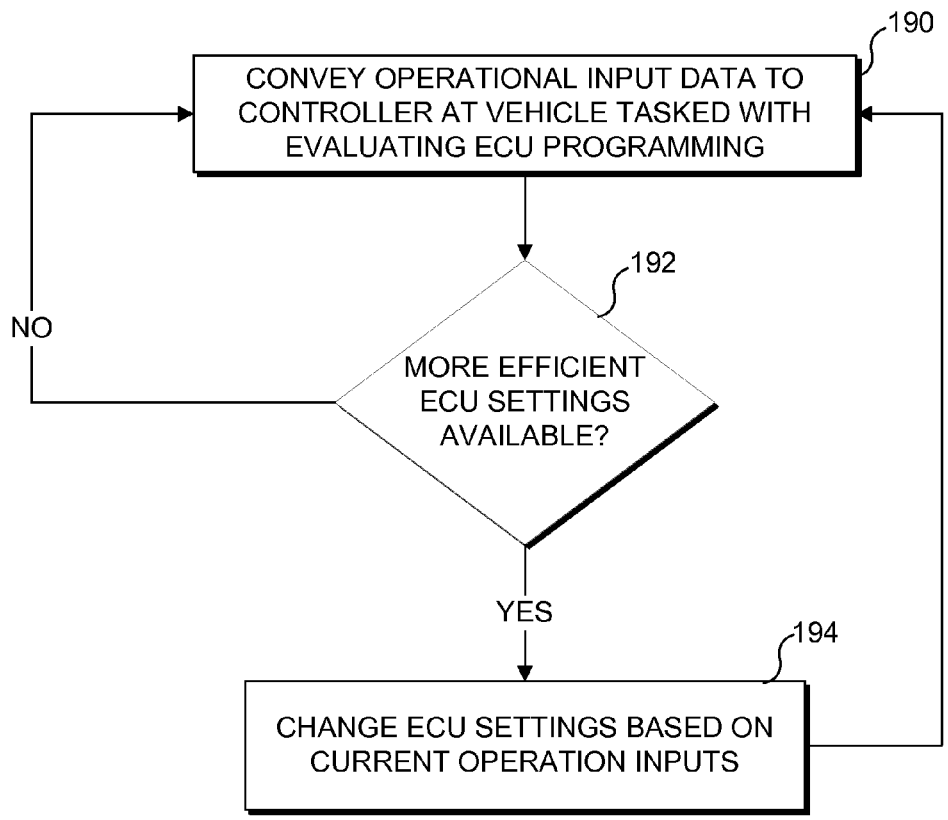
Figure 23:
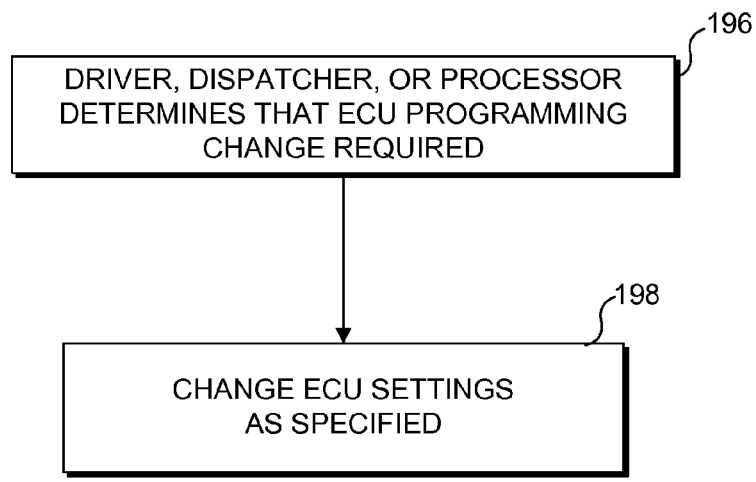

FIG. 3 schematically illustrates a vehicle that includes a plurality of sensors configured to collect the required metrics;

FIG. 4A is a functional block diagram illustrating the functional elements of an embodiment in which the metrics are processed within the vehicle to obtain the driver's performance ranking, for example, in real-time;

FIG. 4B is a functional block diagram illustrating the functional elements of an embodiment in which the metrics are processed by a computing device remote from the vehicle to obtain the driver's performance ranking;

FIG. 5 schematically illustrates the interior of a vehicle configured with a display to provide the driver with the performance ranking in real-time;

FIG. 6 schematically illustrates a vehicle that includes a GPS unit configured to collect GPS data that can be used to provide a plurality of metrics for use in determining a driver performance ranking in accord with one aspect of the concepts disclosed herein;

FIG. 7 is a flow chart showing method steps implemented in an exemplary preferred embodiment, where GPS data are used to provide a plurality of metrics used to determine the driver's performance ranking;

FIG. 8 is a flow chart showing method steps implemented in accord with one aspect of the concepts disclosed herein, the method steps representing an exemplary technique used to implement that aspect, the aspect comprising using GPS or position data are used to determine a slope the vehicle is traveling over (in at least one embodiment, the slope data will in turn be used to calculate an accurate vehicle mass metric);

FIG. 9 is a functional block diagram graphically illustrating force vectors acting on a vehicle, and how those vector can be used to solve for vehicle mass, where the GPS derived slope represents a unique metric;

FIG. 10 is a flow chart showing exemplary method steps implemented according to one aspect of the concepts disclosed herein, where GPS or position derived slope data is used to calculate a vehicle's mass at a plurality of intervals during the operation of a vehicle, and then using the vehicle mass to determine a cost per loaded mile;

FIGS. 11A-11C graphically illustrate vehicle performance histograms generated derived in part using the GPS derived slope data of FIG. 8;

FIGS. 12A-12B graphically illustrate vehicle performance histograms generated derived in part using the GPS derived slope data;

FIG. 13 is a flow chart showing exemplary method steps implemented according to one aspect of the concepts disclosed herein, in which a promotional driver performance campaign is implemented at a hosted website;

FIGS. 14 and 15 are functional blocks diagram illustrating that the promotional driver performance campaigns and bonuses of the method of FIG. 13 can include drivers from a single fleet (intra-company) or drivers from multiple fleets (inter-company);

FIG. 16 is a functional block diagram illustrating exemplary elements in a vehicle/driver performance monitoring system in accord with one aspect of the concepts disclosed herein;

FIG. 17 is an exemplary screen shot of a website hosting a promotional driver performance campaign;

FIG. 18 is a another functional block diagram illustrating exemplary elements in a vehicle/driver performance monitoring system in accord with one aspect of the concepts disclosed herein;

FIG. 19 is an exemplary computing environment for implementing some of the concepts disclosed herein;

FIG. 20 is a functional block diagram of an exemplary telematics device added to an enrolled vehicle to implement one or more of the methods of FIGS. 1, 2, 7, 8 and 10;

FIG. 21 is a functional block diagram of an exemplary vehicle components employed to implement the ECU reprogramming in response to current operational data inputs concept disclosed herein;

FIG. 22 is a flow chart showing exemplary method steps implemented according to one aspect of the concepts disclosed herein, in which vehicle ECU programming is modified in response to one or more current vehicle operational data inputs; and FIG. 23 is a flow chart showing exemplary method steps implemented according to one aspect of the concepts disclosed herein, in which vehicle ECU programming is modified in response to a specific user request for a programming change.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Newly Disclosed Subject Matter

The concepts disclosed herein relate to both newly disclosed subject matter and subject matter presented in a previously filed and unpublished application. The previously filed but not published subject matter provides contextual information that is relevant to the new disclosure, hence it inclusion. The newly disclosed subject matter begins with FIG. 21.

Exemplary Logic for Determining Driver Performance

Figure 1:
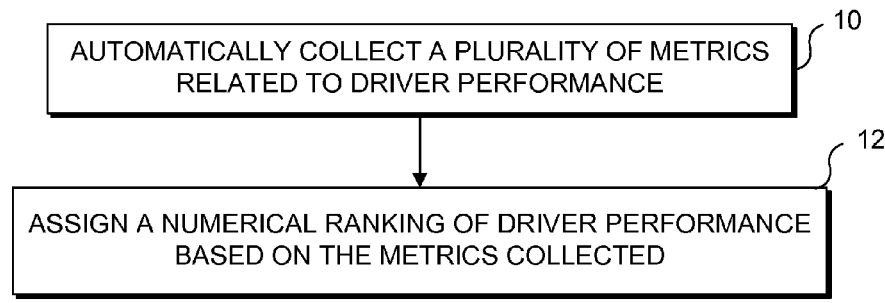
FIG. 1 is a high level flow chart showing the overall method steps implemented in accord with one exemplary embodiment for achieving the concepts disclosed herein.

FIG. 1 is a high level flow chart showing the overall method steps implemented in accord with one aspect of the concepts disclosed herein. In a block 10 a plurality of metrics related to driver performance are automatically collected by a plurality of sensors incorporated into a vehicle. Such metrics generally relate to driver operation of the vehicle, but may also simply include data related to the vehicle. Such metrics can include, but are not limited to, vehicle speed, vehicle acceleration, vehicle deceleration, engine RPMs, idle time, engine temperature, coolant temperature, oil temperature, fuel consumption, and vehicle positional data. Those of ordinary skill in the art will readily recognize that many different metrics related to vehicle performance and driver performance can be collected. Thus, it should be recognized that the specifically identified metrics are intended to be exemplary, rather than limiting. In a block 12, a numerical ranking of the driver's performance is determined based on at least some of the metrics collected.

Figure 2:
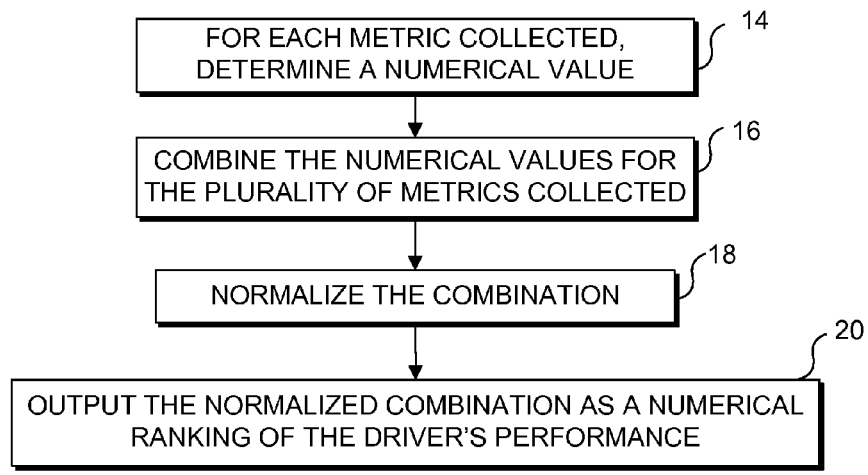
FIG. 2 is a more detailed flow chart showing method steps implemented in an exemplary preferred embodiment.

FIG. 2 is a more detailed flow chart showing method steps implemented in a preferred embodiment, providing additional details as to how the numerical ranking of the driver's performance can be determined. In a block 14, a numerical value is assigned to each metric collected. It should be recognized that plurality of valuation schemes can be implemented, and the specific scheme implemented is not critical. It should also be recognized that a fleet operator can perceive some metrics to be more or less important to overall driver performance. Thus, individual metrics can be weighted differently. For example, one fleet operator may have little tolerance for drivers who exceed posted speed limits and want to place great emphasis on this metric when determining the numerical ranking. Such a fleet operator can assign significantly more weight to the detection of a driver exceeding a speed limit than to the detection of a driver incurring excessive idle time. Regardless of the specific valuation scheme implemented, a numerical ranking will be determined for each metric collected. In a block 16, the numerical rankings for each metric are combined. In a block 18, the combined numerical values for each metric are normalized, to enable performance rankings for different drivers to be more equitably compared. In one embodiment, the normalization is based on a distance over which a driver has operated a vehicle. In another embodiment, the normalization is based on an amount of time the driver has operated a vehicle. This normalization enables the output of the normalized combined total to be provided as a numerical ranking in a block 20 indicating a driver's performance. Note that the valuation scheme implemented will determine whether a specific numerical value is indicative of a relatively good performance or a relatively poor performance. Under some valuation schemes, relatively higher combined and normalized numerical rankings are generally indicative of relatively better driver performance. In other valuation schemes, relatively lower combined and normalized numerical rankings are generally indicative of relatively better driver performance.

FIG. 3 schematically illustrates a vehicle including a plurality of sensors configured to collect the required metrics. A vehicle 22, such as a bus or a truck, includes a plurality of sensors 24a-24h. It should be recognized that the specific number of sensors, and the specific types of sensors and types of data collected by the sensors, are not critical, so long as the sensors collect data for the desired metrics. As noted above, a plurality of different metrics have been specifically identified, however it should be recognized that such metrics are intended to be exemplary, and not limiting on the concepts disclosed herein. In the disclosed exemplary embodiment, each sensor is coupled to a CPU 26 (which, as described in greater detail below, may in some of embodiments be replaced with (or provided in addition to) a transmitter).

FIG. 4A is a functional block diagram 28a illustrating the functional elements of an exemplary embodiment in which the metrics are processed within the vehicle to obtain the driver's performance ranking. The vehicle is equipped with sensors 30 configured to collect the required metrics. The sensors are logically coupled with an onboard vehicle CPU 34, which is configured to implement the method steps generally described above. Onboard CPU 34 is logically coupled to a memory 32 in which are stored the machine instructions that are executed by the onboard CPU 34 to carry out these logical steps. The plurality of metrics collected by sensors 30 can also be stored in memory 32. A (preferably optical or wireless) transmitter 36 (or other data link) can be included to enable either the plurality of metrics or the driver's performance ranking to be communicated to a remote computing device. An optional display 38 can be included in the vehicle to provide real-time feedback to the driver (by displaying the driver's performance ranking in real-time). As discussed above, if display 38 is implemented, it is desirable to provide the ability for the driver to determine which metrics are having the most impact on the driver's performance ranking.

FIG. 4B is a functional block diagram 28b illustrating the functional elements of an exemplary embodiment in which the metrics are processed by a computing device to obtain the driver's performance ranking, where the computing device is remote from the vehicle. Once again, the vehicle is equipped with sensors 30 configured to collect the required metrics. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above for processing the collected metrics can be executed by the remote computing device. Onboard CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, a display is not likely to be beneficial, unless the remote computing device is configured to transmit the calculated performance ranking back to the vehicle for display to the driver.

FIG. 5 schematically illustrates the interior of a vehicle configured with a display 40 to provide the driver with a performance ranking in real-time. As discussed above, such a display can be implemented by the embodiment schematically illustrated in FIG. 4A. While FIG. 5 shows a single numerical performance ranking being dis-played, it should be understood that the concepts disclosed herein encompass displaying a plurality of different metrics (at one or in rotation), as well as displaying a cost per loaded mile metric, which is discussed in detail below in connection with FIG. 10. The cost per loaded mile metric can be calculated using the concepts disclosed herein at a remote computing device and conveyed back to the vehicle for display, or can be calculated using a processor in the vehicle.

FIG. 6 schematically illustrates a vehicle 22a that includes a GPS unit 44 configured to collect GPS data that can be used to determine a plurality of metrics for use in determining a driver performance ranking. Such an embodiment enables the driver performance ranking discussed above to be generated without requiring individual or additional sensors to be integrated into the vehicle (although it should be recognized that such individual sensors could be used in addition to (or as an alternative source of) the data provided by the GPS unit, to provide additional metrics used in determining a driver's performance ranking, generally consistent with the method steps described above with respect to FIGS. 1 and 2). Vehicle 22a, such as a bus or a truck (or automobile, or construction equipment, generally as described above) includes GPS unit 44 coupled with an ignition system 42 of the vehicle. In an exemplary embodiment, the GPS unit will be coupled with the ignition switch, such that it is assumed that when the ignition switch is on, the engine of the vehicle is actually running, and the GPS unit will be activated. As described in greater detail below, GPS data can be used for a plurality of metrics, including idle time, deceleration time and magnitude, acceleration time and magnitude, and to determine if a driver has violated a speed limit. The most basic GPS unit is able to determine a position of the vehicle at a current time. That positional information can be used to calculate the speed of a vehicle by determining the change in position of the vehicle between two successive points in time, and to calculate the acceleration or deceleration of the vehicle by determining the change in speed of the vehicle over a time increment. More typically, GPS units automatically determine position, speed, and acceleration/deceleration internally, and these metrics would then not need to be determined by an external computing device (remote or local).

GPS unit 44 preferably includes or is connected to a wireless transmitter (not separately shown), such that the GPS data can be wirelessly transmitted to a remote computing device, preferably in real-time. The remote computing device can be programmed to manipulate the GPS data to determine a plurality of metrics, which can then be used to calculate a driver's performance ranking, generally as described above. It should be recognized that as an alternative, GPS unit 44 can include an onboard memory, such that the GPS data are stored in the GPS unit, to be uploaded to a remote computing device at a later time (for example, using a wireless or hardwired data link). Significantly, GPS unit 44 enables driver performance rankings to be determined, even if the vehicle is not equipped with separate other sensors of the metric data or an onboard computer (as are required in the embodiments of FIGS. 3, 4A, and 4B). It should be understood that the concepts disclosed herein encompasses coupling such a GPS unit to vehicle sensors and/or a vehicle data bus, such that driver/vehicle performance data collected by other vehicle sensors can be combined with GPS data and conveyed to a remote computing site. While not specifically shown in FIG. 6, it should be understood that GPS unit 44 can include a processor that uses GPS data and sensor data collected from the vehicle to calculate performance metrics, which are then combined with GPS data and conveyed to the remote computing site. One such metric is GPS derived slope data, discussed in detail in below in connection with FIG. 8. Such performance metrics calculated by a processor in the vehicle (whether or not that processor is associated with a GPS unit, or is a separate processor in the vehicle) can be displayed in the vehicle, as well as (or in lieu of) being conveyed to a remote computing device.

FIG. 7 is a flow chart showing method steps implemented in one exemplary embodiment when GPS data are used to calculate a plurality of metrics used to determine the driver's performance ranking. In a block 46, the vehicle ignition is switched on (and it is assumed that the engine is running), thereby powering on the GPS unit. In a block 48, the GPS unit collects GPS data (information corresponding both to a particular point in time and a specific geographical position that the vehicle occupies at that specific point in time). In a block 50, the GPS data are transmitted to a remote computing device. As noted above, the GPS data are preferably transmitted to the remote computing device in real-time. However, it should be recognized that the GPS data can be temporarily stored within the GPS unit (or in a memory electronically coupled to the GPS unit), and transferred to the remote computing device at a later time. In a block 52, the remote computing device uses the GPS data to calculate an idle time metric. Because the GPS unit is only on when the ignition switch is on and the engine of the vehicle is assumed to be running, an assumption can be made that the idle time equals the accumulated time that the GPS unit is on, but the vehicle is not changing position.

In a block 54, the remote computing device uses the GPS data to determine metrics corresponding to acceleration time and acceleration magnitude. In a block 56, the remote computing device uses the GPS data to determine metrics corresponding to deceleration time and deceleration magnitude. In a block 58, the remote computing device uses the GPS data to determine whether a driver has exceeded a speed limit. Those of ordinary skill in the art will readily recognized that several mapping databases exist that include a database of speed limits and which enable a speed limit for a specific portion of a route being driven by a vehicle to be determined based on a particular geographical coordinate of the vehicle following that route. GPS data includes an indication of the speed of the vehicle at a particular time while the vehicle is at a particular geographical location. Once the vehicle speed has been determined for a particular geographical position, a database can be consulted to determine the speed limit associated with that position along the route, thereby enabling a determination to be made as to whether the driver has exceeded the speed limit. In a block 60, the plurality of metrics calculated from the GPS data are used to determine the driver's performance ranking, generally as described above in connection with FIGS. 1 and 2.

It should be recognized that the GPS data can be used to calculate fewer metrics than those described above in connection with FIG. 7, and that the metrics specifically identified in FIG. 7 are intended to be exemplary, rather than limiting. Furthermore, if the vehicle includes other sensors for determining metrics, the sensor data can also be forwarded to the remote computing device to be used in calculating the driver's performance ranking, also generally as described above. Furthermore, it should be recognized that rather than (or in addition to) transmitting the GPS data to a remote computing device, the GPS data can be conveyed to a computing device on the vehicle, for determining the driver's performance ranking.

Preferably, performance rankings are determined for each driver in a company (or each driver of a vehicle for which driver performance is of interest), and posted publicly so that drivers can compare each other's individual performance rankings. The public display of driver performance is expected to provide an incentive for drivers to improve their driving performance rankings.

It should be understood that the concepts disclosed herein encompass many differ types of performance metrics, and different techniques for collecting them. In at least some embodiments, as exemplified by FIG. 6, the performance metrics are transmitted from the vehicle to a remote computing device by a wireless data link enabled GPS unit (such as a GSM/GPS), that also collects location data during the vehicle's operation. It should be understood that such performance metrics can also be collected using a data recorder that does not have wireless data transmission capability, such that data will need to be exported from the data recorder to a remote computing device periodically, or the data recorder will need to be removed from the vehicle and coupled to a computing device periodically to export the data used to calculate the driver performance metric(s).

While specific parameters or metrics used to derive a driver performance metric have been discussed above, it should be recognized that the following different parameters/metrics are specifically encompassed herein. One or more embodiments in which the performance metric is based at least in part from data collected from one or more engine control units (or vehicle computer) in a vehicle operated by the driver whose performance is being measured. One or more embodiments in which the performance metric is based at least in part on fuel economy. One or more embodiments in which the performance metric is based at least in part on carbon footprint reduction. One or more embodiments in which the performance metric is based at least in part on minimizing fuel efficiency robbing behavior, including sudden braking, rapid acceleration and downshifting too early. One or more embodiments in which the performance metric is based at least in part on maximizing fuel efficiency enhancing behavior, including coasting to a stop (instead of staying on the accelerator until the last minute and then braking hard), high average vehicle speeds with minimum time spent at maximum vehicle speed, high percent trip distance in top gear (90+% recommended), high percent distance in cruise control, minimum percent idle/PTO operation, minimum service brake activity, low number of sudden decelerations, and low service brake actuation's/1000 miles.

Another aspect of the concepts disclosed herein is a technique to monitor vehicle location data (i.e. GPS data) over time to determine the actual operating speed of a fleet vehicle. Many fleet operators have the ability to define maximum speed parameters on their vehicles. Maximum speed parameters are defined to enhance safety and to reduce fuel costs (statistics indicated that for heavy trucks every MPH over 62 MPH reduces fuel economy by 0.1 MPG). However, these speed settings can fail due to maintenance issues, or driver manipulations. The maximum speed setting is based on understanding the size of the vehicle's tires. If during maintenance a different size tire is used as a replacement, the predefined speed settings will be inaccurate. Because drivers are often paid by the mile, drivers have an incentive to defeat the maximum speed settings, and drivers may encourage the use of different tire sizes, so they can go faster than the maximum speed setting, to increase their earnings. Drivers can also purchase and install aftermarket kits designed to bypass speed governors, again so they can go faster than the maximum speed setting, to increase their earnings. The concepts disclosed herein encompass collecting GPS data during the operation of a fleet vehicle, and analyzing the location and time parameters of that data to identify when a fleet vehicle exceeds a predefined maximum speed. The GPS verified speed metric can be used as a driver performance metric on its own, or be combined with other metrics to generate a driver performance metric.

Another aspect of the concepts disclosed herein is to monitor manual overrides for cooling fans in fleet vehicles. Such cooling fans, generally controlled by a vehicle engine control unit (ECU) or vehicle computer, consume up to 50-70HP, and measurably reduce fuel economy. Drivers who habitually override the automatic fan settings can consume unnecessary amounts of fuel. Thus the concepts disclosed herein encompass monitoring a driver's use of cooling fan manual override, to facilitate an evaluation of a driver's performance, and to enable drivers who use such overrides excessively to be identified and trained to reduce their use of manual cooling fan overrides. The cooling fan manual override metric can be used as a driver performance metric on its own, or be combined with other metrics to generate a driver performance metric.

Another aspect of the concepts disclosed herein is to monitor engine RPMs during a driver's operation of a vehicle. Over revving an engine can lead to increased fuel use and engine wear. Drivers who habitually over rev their vehicles engines can consume unnecessary amounts of fuel. Thus the concepts disclosed herein encompass monitoring the RPM parameters while a driver operates a vehicle, to facilitate an evaluation of a driver's performance, and to enable drivers who consistently over rev their vehicle's engines to be identified and trained to reduce their over revving behavior. The over revving metric can be used as a driver performance metric on its own, or be combined with other metrics to generate a driver performance metric.

Another aspect of the concepts disclosed herein is to monitor the shifting behavior during a driver's operation of a vehicle. Not running a heavy truck in the highest possible gear when possible can lead to increased fuel use and engine wear. Statistics indicate that every 10% drop of time in top gear results in a 0.5% mpg loss. Thus the concepts disclosed herein encompass monitoring shifting behavior while a driver operates a vehicle, to facilitate an evaluation of a driver's performance, and to enable drivers who consistently under shift to be identified and trained to reduce their over revving behavior. The shifting pattern metric can be used as a driver performance metric on its own, or be combined with other metrics to generate a driver performance metric.

Another aspect of the concepts disclosed herein is to monitor the amount if idle time during a driver's operation of a vehicle. Increased idle leads to increased fuel use and engine wear. Thus the concepts disclosed herein encompass monitoring idle time behavior while a driver operates a vehicle, to facilitate an evaluation of a driver's performance, and to enable drivers who excessively allow their vehicle to idle to be identified and trained to reduce their excess idle behavior. The excessive idle metric can be used as a driver performance metric on its own, or be combined with other metrics to generate a driver performance metric.

Another aspect of the concepts disclosed herein is to monitor a load placed upon a vehicle's engine during a driver's operation of a vehicle. While related to RPM, load is not equivalent. An estimation of engine load is sometimes calculated by a vehicle ECU, and different manufacturers use different combinations of parameters to calculate engine load, including but not limited to throttle position, RPM, manifold pressure, air flow, temperature, air conditioning clutch status, power steering pressure, and transmission gear status. Where engine load is increased without performing more useful work (i.e., carrying more cargo), increased fuel use and engine wear result without a net benefit. Drivers who habitually operate their vehicles under higher engine loads than required consume unnecessary amounts of fuel. Thus the concepts disclosed herein encompass monitoring engine load while a driver operates a vehicle, to facilitate an evaluation of a driver's performance, and to enable drivers who consistently over load their vehicle's engines to be identified and trained to reduce their over loading behavior. The engine load metric can be used as a driver performance metric on its own, or be combined with other metrics to generate a driver performance metric.

Calculation of an Exemplary Performance Ranking

The calculation of an exemplary performance ranking is described below in regard to one exemplary embodiment. It should be recognized that this approach for determining the performance ranking is not intended to be limiting, but rather to be illustrative of one contemplated valuation scheme and performance ranking implementation. In the exemplary performance ranking, a relatively higher numerical ranking value is generally indicative of relatively poorer driver performance. Thus, in this example, the lower the numerical performance ranking, the better the driver's performance.

In this example, the sensor data are collected for various metrics corresponding to vehicle acceleration, vehicle deceleration, vehicle idle time, and vehicle speed. Each minute of acceleration time will be assigned one point. Each minute of deceleration time will be assigned one point. Each minute of idle time will be assigned one point. In this example, the fleet operator is also particularly concerned with drivers who violate speed limits on the freeway. Thus, each minute where the vehicle speed exceeds 60 miles an hour while the driver is driving the vehicle on the freeway will result in five points (the fleet operator weighting excessive vehicle speed five times greater than the other metrics). The points are added together to achieve a combined total. The total is then normalized to derive a numerical ranking value for the driver. As noted above, the normalization can be based on either distance driven or time of operation, or a combination thereof.

Calculation of a Work Based Performance Ranking Using GPS Derived Slope Data

The concepts disclosed herein encompass using data collected during the operation of a vehicle to calculate a weight of the vehicle, and then using the calculated weight in a performance analysis of the vehicle. The novel vehicle weight calculation disclosed herein employs in part vehicle position data collected while a vehicle is moving. The position metric can be automatically determined using a global positioning satellite (GPS) receiver installed in the vehicle, to track the vehicle's change in position over time. It should be recognized that the GPS system is but one of a plurality of different vehicle position sensing technologies that can be employed.

Fundamentally, GPS systems calculate velocity in three components (X, Y, Z or N/S, E/W, and Up/Down) based on a Doppler shift of the GPS satellite signals. Scalar speeds can then be calculated from those three components. For example, absolute speed or actual vehicle speed can be determined, as well as ground speed based on the shortest distance between two points (i.e., based on distance as the crow flies).

Horizontal ground speed ($V_{HGS}$) can be calculated using the following relationship based on the Pythagorean theorem:

$$V_{HGS} = \sqrt{x^2 + y^2} \quad (1)$$

To calculate a grade (G) the vehicle is traveling over (as a percentage), one can take the Z/Up magnitude and divide it by the horizontal ground speed, $V_{HGS}$, which results in the following relationship:

$$G = \frac{100(Z)}{V_{HGS}} \quad (2)$$

Replacing Z, x and y with directional vectors (such as Up for Z, West for x and North for y, recognizing that such directional vectors are exemplary, and may change based on the actual GPS data collected from the vehicle) results in the following relationship:

$$G = \frac{100(\text{Up})}{\sqrt{W^2 + N^2}} \quad (3)$$

Once one has derived G as discussed above, very useful vehicle performance metrics can be determined.

One exemplary use of the slope data is to determine the mass of the vehicle at that time. Mass is a useful metric that can be used as a feedback metric for controlling certain vehicle systems. Some vehicle engine control units (ECUs) use torque output, engine RPMs, and vehicle velocity to calculate a vehicle's mass or weight (as used herein and in the claims that follow, the terms mass and weight are used synonymously, because on the surface of the Earth, the acceleration due to gravity (the "strength of gravity") is approximately constant; thus the ratio of the weight force of a motionless object on the surface of the Earth to its mass is almost independent of its location, so that an object's weight force can stand as a proxy for its mass, and vice versa). That ECU weight/mass determination technique is error prone, because it does not take into account any slope conditions.

Even though the ECU weight/mass determination technique is error prone, the ECU weight/mass determination technique mass estimation provides a metric that can be used to as a feedback metric for various vehicle systems, including transmission shift points, engine RPM control, and emission controls. Having more accurate mass metrics (by including the GPS derived slope data in a mass calculation) will provide an improved mass metric. The concepts disclosed herein specifically encompass a GPS unit configured to use GPS data to calculate slope, to use the slope data and other vehicle parameters to determine vehicle mass (generally as discussed below), and then to provide a GPS slope based vehicle mass metric to a vehicle ECU to be used as a metric to control vehicle operation.

Vehicle mass can also be used as an analytical metric to determine how much work a vehicle has performed. Being able to accurately determine the amount of work a vehicle is performing will help vehicle operators analyze their use patterns to seek out efficiency improvements. The GPS derived slope data enables more accurate vehicle mass calculations to be determined, which in turn will provide an improved vehicle performance data set that can be mined to identify areas in which efficiency improvements could be made.

Having described the GPS based slope determination technique; the following relationships will be used to obtain vehicle mass from the GPS determined slope (G). These relationships define the forces acting on the vehicle, and include a force related to a grade the vehicle is traveling over, an aerodynamic force, a frictional force, and a force applied by the vehicle to overcome the forces acting on the vehicle. The understanding of these forces is not new, but what is novel are techniques disclosed herein to measure certain parameters that are used to calculate such forces. Being able to measure those parameters, such as a grade the vehicle is traveling over, enables more accurate force calculations to be performed, which in turn enables a better understanding of vehicle operational efficiency.

A first force opposing a motion of the vehicle relates to a grade or slope the vehicle is traveling over, which can be defined using the relationship of Equation (4).

$$f_{grade} = m*g*G \tag{4}$$

where m is vehicle mass and g is the local gravitational field (i.e., Earth's gravity).

A second force opposing a motion of the vehicle relates to aerodynamic forces acting on the vehicle, which can be defined using the relationship of Equation (5).

$$f_{areo} = \frac{1}{2}*p*C_d*A*v^2 \tag{5}$$

where $\rho$ is air density, $C_d$ is the coefficient of drag of the vehicle, A is the frontal area of the vehicle, and v is the vehicle velocity (which can be obtained from the vehicle databus or from GPS data).

A third force opposing a motion of the vehicle relates to frictional forces acting on the vehicle, which can be defined using the relationship of Equation (6).

$$f_{Friction} = C_{rr}*m*g*(1-G) \tag{6}$$

where $C_{rr}$ is the coefficient of rolling resistance of the vehicle (which is assumed to be constant), m is vehicle mass, g is the local gravitational field (i.e., Earth's gravity), and G is the slope, which is calculated using the GPS data as discussed above.

The force generated by the vehicle to overcome these opposing forces can be defined using the relationship of Equation (7).

$$f_{Applied} = \frac{\tau * \frac{N}{v} * \pi}{r} \tag{7}$$

where $\tau$ is engine output torque (as measured at the vehicle by vehicle sensors/reported by the vehicle databus), N is engine RMPs (as measured at the vehicle by vehicle sensors/reported by the vehicle databus), v is the vehicle velocity (which can be obtained from the vehicle databus or from GPS data), $\pi$ is the mathematical constant defined as the ratio of any circle's circumference to its diameter, and r is the radius of the vehicles tires.

Vehicle mass is a parameter in the grade and frictional force relationships, of Equations (4) and (6), respectively. The mass parameter itself can be defined using the relationship of Equation (8).

$$m = \frac{f_{Applied} - f_{Friction} - f_{Grade} - f_{Aero}}{\alpha} \tag{8}$$

where m is vehicle mass and $\alpha$ is acceleration (which can be obtained from the vehicle databus or from GPS data). In an exemplary embodiment, acceleration is obtained from the vehicle sensors.

Equations (4)-(8) can be solved to obtain mass, as defined using the relationship of Equation (9).

$$m = \frac{f_{Applied} - f_{Aero}}{a + g*(C_{rr} + S - C_{rr}*S)} \tag{9}$$

Note that the following parameters will be measured during vehicle operation in order for mass to be calculated: velocity, torque, RPM. Those parameters, combined with the GPS derived slope data, and known parameters (gravity, air density, rolling resistance, frontal area, drag, pi, and tire radius) can be used by a processor in the vehicle to calculate mass. Velocity, torque, and RPM represent metrics that many vehicles already measure during vehicle operation, and thus can be accessed by tapping into a vehicle ECU or databus. The concepts disclosed herein specifically encompass a GPS unit (or other position sensing unit) including a data port coupled to a vehicle ECU/data bus and a processor configured to calculate a GPS derived slope metric (generally as discussed herein) and a vehicle mass metric (generally as discussed herein, using in part the GPS derived slope data).

Having an accurate mass parameter, determined in real-time during the operation of the vehicle, will enable a more accurate measurement of the work being performed by the vehicle to be measured. The work metric can be used as a driver performance metric on its own, or be combined with other metrics to generate a driver performance metric.

FIG. 8 is a flow chart showing method steps implemented in an exemplary embodiment, where position data (such as GPS data) collected during the operation of a vehicle is used to determine a slope or grade over which the vehicle is being operated. That grade then can be used to calculate other data, such as a weight or mass of the vehicle. In a block 120, three dimensional position data (longitude, latitude and elevation) is collected during operation of the vehicle. In at least some embodiments, that data is conveyed from the vehicle to a remote computing site (i.e., a monitoring/data storage location) in real-time. In other embodiments, the position data is stored in a memory in the vehicle, to be conveyed to a remote computing site at a later time. In a block 122, the position data is used to determine horizontal ground speed, using the relationship of Equation (1). In a block 124, the horizontal ground speed and the position data is used to determine the slope or grade, using the relationships of Equations (2) and (3).

In an optional block 126, the slope data is used to calculate a mass of the vehicle, using the relationship of Equation (9). In at least some embodiments, the data processing of blocks 122, 124, and 126 are performed by a remote computing device. however, the concepts disclosed herein encompass embodiments where some or all of the data processing of blocks 122, 124, and 126 are performed by a processor or logic circuit in the vehicle. In at least some embodiments in which the data processing is implemented in the vehicle, the mass parameter is used by an ECU in the vehicle to control operating parameters of the vehicle. For example, vehicle mass can be used as a feedback parameter for controlling vehicle operations, including engine speed (RPM), transmission gear selection, and fuel flow/mixture (to control vehicle emissions). While using vehicle mass data used as a feedback parameter for controlling vehicle operations has been implemented before, those implementations have not used GPS derived slope data as a parameter to determine vehicle mass.

FIG. 9 graphically illustrates force vectors acting on a vehicle, including a frictional force, an aerodynamic force, a grade/slope related force, and a vehicle applied force used to overcome the opposing forces. The forces are discussed above in connection with Equations (4)-(7), and those relationships can be used to use GPS derived slope data to calculate vehicle mass, as shown in Equation (9).

FIG. 10 is a flow chart showing method steps implemented in an exemplary embodiment, where GPS derived slope data and vehicle mass data calculated using GPS derived slope data position data are used to analyze vehicle performance, to determine a cost per loaded mile. Because the concepts disclosed herein provide an improved vehicle mass parameter that is determined while a vehicle is operating, the analysis of the work performed by the vehicle, and the cost per loaded mile calculation, are more accurate than have been heretofore obtainable using data derived by existing techniques. In a block 120, three dimensional position data (longitude, latitude and elevation) is collected during operation of the vehicle. As noted above, in at least some embodiments, that data is conveyed from the vehicle to a remote computing site (i.e., a monitoring/data storage location) in real-time, while in other embodiments, the position data is stored in a memory in the vehicle, to be conveyed to a remote computing site at a later time. In a block 123, fuel use and mileage data is collected during the operation of the vehicle. In a block 126, GPS derived slope data is used to calculate vehicle mass, generally as discussed above. Then, in a block 127, the mileage data, fuel use data, and vehicle mass data are used to slope data is used to calculate a cost per loaded mile metric.

Fleet operators recognize that cost per loaded is a metric that can be analyzed to improve the efficiency of their fleets, by allowing driver performance to be evaluated, and by allowing different routes to be analyzed, to determine the actual cost of servicing a particular route. While these concepts are not new, what is new is the improved vehicle mass metric that can be calculate in real-time while the vehicle is operated, or at a later, where the mass metric is available for the duration of the vehicle operating segment (or trip). Note that in the prior art, unless the vehicle was weighed during the trip (i.e., before the trip, after the trip, or during the trip at a scale stop) such accurate vehicle mass data was not available, so the cost per loaded metric was error prone, or accurate based on data collected at only a few selected segments of the trip. The concepts disclosed herein are based on collecting vehicle operational data (fuel use, mileage, position data, etc.) frequently (i.e., multiple times a minute, or at least once every few minutes, such intervals being exemplary) so that vehicle mass can be accurately calculated at almost any time during the operation of a vehicle.

An exemplary data set collected from a vehicle will include time indexed position data, engine RPM data, vehicle torque data, and vehicle speed. This data will be collected frequently (multiple times per minute, or a plurality of times over a ten minute period) while the vehicle is operational. Note that vehicle speed can be determined by analyzing position data over time, or can be measured using a vehicle sensor (note that comparing vehicle speed obtained from vehicle sensors with vehicle speed calculated based on GPS data can identify errors in the vehicle speed sensor, which can be caused by incorrect tire sizes, or driver added speed cheating devices designed to override vehicle speed governors). Such a data set can also include other types of vehicle data, including, but not limited to, data relating to the vehicle transmission (so drivers can be evaluated based on percentage of time spent in the most efficient gear), data relating to the vehicle braking system (so drivers can be evaluated based on their braking behavior), data relating to the use of cooling fan overrides (so drivers can be evaluated based on how often they such an override that reduces fuel efficiency), data relating to idle time (so drivers can be evaluated based on percentage of time spent in wasting fuel by idling, noting that idle time can be evaluated in light of position data, so that drivers are not penalized for idling at traffic lights), data relating to the use of a vehicle's cruise control system (so drivers can be evaluated based on percentage of time spent driving at fuel efficient speeds). Note this exemplary data set includes the data required to calculate vehicle mass using GPS derived slope data, generally as discussed above.

FIGS. 11A-11C graphically illustrate histograms that can be derived using the exemplary data set discussed above. These histograms can be used by fleet operators to evaluate the efficiency performance of individual drivers and/or individual vehicles, being operated over specific routes (the routes being defined by the position data). Each Figure has a histogram based on a vehicle being operated with a heavy load, and a histogram based on a vehicle being operated with a light load. In FIG. 11A, speed histograms show a percentage of time a vehicle is operated at specific speeds, enabling fleet operators to determine how often the driver/vehicle is using the most efficient vehicle speeds. The histograms include bars that show load vs. speed, and time vs. speed. In FIG. 11B, RPM histograms show a percentage of time a vehicle is operated at specific RMP settings, enabling fleet operators to determine how often the driver/vehicle is using the most efficient engine speeds. The histograms include bars that show load vs. RPM, and time vs. RPM. In FIG. 11C, load histograms show a percentage of time a vehicle is operated at specific load settings, enabling fleet operators to determine how often the driver/vehicle is placed under the most demanding loads. In exemplary embodiments, when appropriate, the histograms of FIGS. 11A-11C can be generated using the vehicle mass calculated using GPS derived slope data, generally as discussed above.

FIGS. 12A and 12B graphically illustrate histograms that can be derived using the exemplary data set discussed above. These histograms can be used by fleet operators to evaluate the efficiency performance of individual drivers and/or individual vehicles, being operated over specific routes (the routes being defined by the position data). The histogram of FIG. 12A includes bars that show the cost per loaded mile and MPG for 14 different trips (each trip being defined by a different set of position data from the exemplary data set.). The histogram of FIG. 12B includes bars that show the cost per loaded mile and MPG for 14 different trips, with the data being normalized to a 30 ton load. In exemplary embodiments, the histograms of FIGS. 12 and 12B are generated using the vehicle mass calculated using GPS derived slope data, generally as discussed above.

Hosted Website for Tracking Driver Performance Data

One aspect of the concepts disclosed herein is a hosted website, enabling drivers and fleet operators to monitor the performance of drivers, based on data collected during the drivers operation of a vehicle. In at least one embodiment, drivers can compare their performance metrics to their peers, although the concepts disclosed herein also encompass embodiments where individual drivers can only see their own performance scores. Fleet operators can use these performance metrics as incentives, by linking driver pay with performance.

In general, one or more performance metrics are automatically collected while a driver is operating a vehicle, and that data is used to generate a score or rating of the driver's performance. In at least one embodiment, the score is normalized to enable driver scores from other types of vehicles to be compared. Then, the driver performance data is posted to the hosted website.

In at least one related embodiment, fleet operators will pay drivers using a mileage component (i.e., paying drivers a fixed rate per loaded mile), while also making additional payments to drivers meeting predefined performance characteristics. The hosted website can be used as a forum to enable drivers to track their progress in achieving their pay for performance goals. Fleet operators will have a wide degree of freedom in designing pay for performance goals or campaigns. For example, Fleet A can design a campaign in which only drivers having performance scores in the top 10% of the fleet will earn performance pay. Fleet B can design a campaign in which only the top 25 scoring will earn performance pay during a particular campaign. Fleets can predefine the amount of performance pay each driver can earn. Fleets can also predefine a performance pay pool, such that the share of the pool earned by each driver is a function of the number of drivers meeting predefined performance goals for the campaign.

In at least one embodiment, the performance metric will be a work based performance metric whose calculation involves using vehicle mass determined using GPS derived slope data, generally as discussed above.

It should be recognized that performance campaigns can be metric specific (hard braking performance, idle time performance, such metrics being exemplary and not limiting), or can be based on a single normalized score (cost per loaded mile), but will share in common the characteristic of being implemented for a defined period of time. Drivers will learn to associate such campaigns with opportunities to increase their pay by meeting the performance goals of individual campaigns.

FIG. 13 is a flow chart showing method steps implemented in an exemplary embodiment. In a block 62, the hosted website defines a campaign (noting that the website host may be a fleet operator providing the website for only their drivers, or the hosting website host may be offering the driver performance campaign to drivers from multiple fleets). Parameters of the campaign being defined will likely include a duration of the campaign, the prize or performance pay being offered, the eligible pool drivers, and any rules governing disqualification (such as any safety violation or speeding ticket automatically disqualifying a driver), noting that such parameters are exemplary, and not limiting. The concepts disclosed herein encompass embodiments in which campaigns are fleet specific, such that only drivers from a specific fleet can participate in that campaign (in such an embodiment, the specific fleet is likely funding the prize, although some third party, such as a favored vendor, customer, or advertiser might offer to fund the prize). The concepts disclosed herein encompass embodiments in which campaigns are not fleet specific, such that drivers from multiple fleets can participate in that campaign (in such an embodiment, an advertiser or transportation industry vendor might offer to fund the prize).

In at least one embodiment, the campaign duration is open ended, in that the hosted website will track a drivers' performance data over time, so the driver can use that data to look for other employment opportunities. For example, fleets would likely compete among themselves for drivers having a combination of experience and high performance rankings.

In a block 64, driver performance data is posted to the hosted website. The concepts disclosed herein encompass permutations and combinations of the following: embodiments in which fleet operators can view performance rankings for all of their drivers, but not drivers of other fleets, embodiments in which drivers can only view their own personal performance ranking, embodiments in which drivers can view performance ranking for all of the drivers in their fleet, but not drivers of other fleets, and very transparent embodiments, in which interested parties can visit the website and peruse driver performance rankings with little restrictions.

In a block 66, at the end of the defined campaign, the winning driver (or drivers) are announced and paid a performance pay bonus.

As noted above, in some embodiments, campaign participants are limited to drivers in a specific fleet (i.e., an intra-company or intra-fleet campaign). In such embodiments, that fleet generally will be paying the performance bonuses for the campaign. In other embodiments, campaign participants are not limited to drivers in only one specific fleet (i.e., an inter-company or inter-fleet campaign). In such an embodiment, a third party may be paying the performance bonuses for the campaign. For example, companies providing goods and services to the trucking or vehicle transportation industry may sponsor such a campaign for advertising purposes. A particular fleet operator seeking to attract the attention of drivers in other fleets might also be a sponsor of an inter-company campaign. FIG. 14 is a block diagram indicating that block 62 of FIG. 13 can encompass both intra-company campaigns, as indicated in a block 68, as well as inter-company campaigns, as indicated in a block 70. FIG. 15 is a block diagram indicating that the performance bonus can encompass both intra-company payouts, as indicated in a block 74 (where those bonus funds are used only to pay drivers of a specific fleet), as well as inter-company payouts (where those bonus funds are used to pay any winning driver, regardless of fleet), as indicated in a block 76.

In at least one aspect of the concepts disclosed herein, the performance metric is designed to facilitate comparison of driver performance data across different fleets, and different vehicles. This will enable individual campaigns to include more participating drivers, which in turn will bring in more advertising revenue to fund bigger performance bonuses. In at least one embodiment, such a metric is mutually agreed upon by a plurality of different fleet operators. Adoption of a common performance metric across multiple fleets will enable top performing drivers to be able to show their cumulative performance scores to other participating fleet operators, providing an additional tool for fleets to use when evaluating potential new hires. Such a common performance metric will also enable participating fleet operators to appear more attractive as potential employers than non-participating fleet operators, who will not be offering the drivers the potential of earning the additional performance based income (i.e., income in addition to the industry standard pay by the mile driver compensation).

The concepts disclosed herein encompass embodiments in which individual fleet operators host their own website, where driver rankings in that fleet can be compared. In other embodiments, the website is hosted by a third party, and multiple fleet operators participate. The third party can offset their costs for operating the website by charging participating fleet operators a fee, and/or by advertising revenue. In some embodiments, all driver performance data is displayed in an anonymous format, so that individual drivers cannot be identified unless the driver shares their user ID. In some embodiments, drivers can only compare their score with drivers in their own fleet, while in other embodiments drivers can see the performance data of drivers in other fleets.

FIG. 16 is a functional block diagram of various elements that can be employed to implement the hosted driver performance website concept, in one exemplary embodiment. The elements includes a plurality of enrolled vehicles 148a-148c (noting that the concepts disclosed herein can be applied to a different number of vehicles), a plurality of drivers 152a-152c (noting that the concepts disclosed herein can be applied to a different number of drivers), a plurality of vehicle operators 156a-156c (noting that the concepts disclosed herein can be applied to a different number of vehicle operators), and a remote monitoring service 150. Each vehicle includes the components discussed above in connection with FIG. 3 (noting the number and types of sensors disclosed in FIG. 3 are exemplary, and not limiting), enabling the vehicle to convey performance data from the vehicle to remote monitoring service 150, which monitors the performance data from each vehicle 148a-148c over time to enable the driver's performance while operating that vehicle to be evaluated. In an exemplary embodiment monitoring service 150 generates a webpage (as indicated by webpages 154a-154c) for each vehicle operator, so the vehicle operator can review the performance rankings of each of their drivers. It should be understood that the concepts disclosed herein also encompass other website designs, and the webpage per fleet is not the only possible model. In one embodiment, drivers will have their own webpage 154d (alternatively, drivers can access the webpage for their specific fleet).

It should be understood that monitoring service 150 is implemented using a remote computing device, and that the term remote computing device is intended to encompass networked computers, including servers and clients, in private networks or as part of the Internet. The monitoring of the vehicle/driver performance data and driver performance ranking by monitoring service 150 can be performed by multiple different computing devices, such that performance data is stored by one element in such a network, retrieved for review by another element in the network, and analyzed by yet another element in the network.

FIG. 17 is an exemplary screen shot of a webpage accessed by a driver to review his (or her) performance ranking. It should be understood that the exemplary webpage of FIG. 17 is based on having a webpage upon which drivers for a specific fleet can view their individual scores, as well as the scores of other drivers in their fleet. The concepts disclosed herein specifically encompass embodiments where drivers can view only their own performance rankings, in which case a different webpage design would be employed.

Referring to FIG. 17, a webpage 100 includes a first portion 102 that enables a driver to select a specific driver from among a plurality of drivers. The driver identities can be made anonymous, as shown in FIG. 17 (numbers, not names), or some fleets may wish to list drivers by name (noting that privacy and consent issues for such a scheme are not discussed herein). It should be understood that webpage 100 can be unique to only one driver, such that portion 102 is not required. Using numbers to identify drivers enables individual drivers to look at the scores of their peers, without being able to individually identify which driver obtained what score. The driver will likely only know his own unique number, and thus will only be able to personally identify his or her own score. Webpage 100 also includes a results section 104, where details of the selected driver's performance ranking are disclosed. It should be understood that the elements shown on webpage 100 can be displayed on different portions of the webpage, or on different webpages and/or different websites, instead of together. Webpage 100 also includes an ad section 112, where the website host can earn revenue by displaying advertising, and a performance tip section 106, where the website host provides tips to the driver for improving their performance ranking.

Referring to first portion 102, a driver has selected driver number ZONA0047 (noting that any type of driver identification can be employed), such that the data displayed in results section 104 and performance tip section 106 relate to driver ZONA0047. As shown in FIG. 17, results section 104 includes results from three different campaigns, recognizing that in some embodiments drivers will be participating in multiple campaigns (although it should be recognized that the concepts disclosed herein encompass embodiments where drivers participate a greater number of campaigns, or fewer campaigns, including only a single campaign (noting the duration of the single campaign could span the driver's career).

Referring to results section 104, exemplary (but not limiting) information displayed herein includes details on the campaign, whether the campaign is inter-company or intra-company, and the driver's performance ranking for that campaign. A visual guide to the driver's relative performance is displayed using a plurality of fuel pump icons (where a greater number of fuel pump icons, or other graphical icons, indicates a better performance rating). As shown, webpage 100 is based on displaying 10 fuel pump icons for each campaign (icons 108a-108c), enabling the driver's performance to be graphically displayed on a scale of 1 to 10. Thus, a driver whose performance ranking is in the top $80^{th}$ percentile would have 8 solid or un-shadowed fuel pumps. Recognizing that while only full icons are displayed in this example, partial fuel pump icons can be used as well, to provide fractional ratings, or numbers between 0 and 10 can be rounded up to the next whole number. Radio buttons 110a-c can be used by the driver to select performance tips for the particular campaign to be displayed in section 106.

With respect to webpage 100, it should be understood that the design of webpage 100 is intended to be exemplary, and different webpage designs can be employed; and further, that the data on webpage 100 can be provided to the vehicle operator on more than one webpage. If desired, access to webpage 100 can be restricted only to the fleet operator employer the driver and the driver themself. However, providing other drivers access to webpage 100 will enable drivers to see how they rank compared to their peers, encouraging drivers to compete amongst themselves to collect the performance bonus available in campaigns.

Referring once again to section 104 of webpage 100, note that a first campaign (associated with radio button 110a) is identified as INTRA-COMPANY RANKING. This campaign is a fleet sponsored campaign for all of the fleet drivers to compete with each other for a performance bonus. Driver ZONA0047 ranks as 83$^{rd}$ out of 225 drivers, with lower numbers indicating better performance (i.e., the top ranking driver would be ranked as 1, noting that the fleet operator could have reversed the logic, such that 225 was the top ranking driver). Being the 83$^{rd}$ lowest ranking driver out of a fleet of 225 drivers places driver ZONA0047 in the top 63% ((225−83)/(225*100)=63.11%). Six fuel pump icons 108a are filled in. The campaign parameters are summarized, indicating that drivers having rankings from 1-25 (i.e., the top 88.89%) across the entire fleet share in the bonus pool assigned to this campaign. Driver ZONA0047 needs to increase his ranking from 83$^{rd}$ to 25$^{th}$ in order to be eligible for a share in the bonus pool. Note that campaigns can be configured such that the top 25 drivers earn equal shares of the bonus pool, and campaigns can also be configured such that higher ranking drivers (i.e., closer to #1) earn a proportionally larger share of the bonus pool.

Referring once again to section 104 of webpage 100, note that a second campaign (associated with radio button 110b) is identified as INTRA-COMPANY CAMPAIGN XYZ. This campaign is a fleet sponsored campaign for all of the fleet drivers to compete with each other for a performance bonus. Driver ZONA0047 has no ranking indicated in the campaign, thus all ten fuel pump icons 108b are shadowed or empty. The campaign parameters are summarized, indicating that Campaign XYZ includes a bonus pool to be shared by the 10 fleet drivers having the most improved performance scores for December 2011. Driver ZONA0047 has selected radio button 110b so that performance tips and additional information related to Campaign XYZ are displayed in section 106. Those performance tips include a first tip indicating that late shifting reduced Driver ZONA0047's performance ranking by 9.2% over the last 14 days. A second performance tip indicates that hard breaking events reduced Driver ZONA0047's performance ranking by 5.3% over the last 19 days. Finally, the last performance tip indicates that excessive idling on Dec. 11, 2011 disqualified Driver ZONA0047 from Campaign XYZ. It should be recognized that the specific performance tips shown in section 106 are intended to be exemplary, and not limiting. The actual performance tips displayed will be related to the specific campaign, and designed to provide feedback to individual driver's to enable them to identify behaviors that have reduced their performance ranking.

In some embodiments section 112 includes banner ads targeted to drivers. In other embodiments section 112 includes advertising from vendors who are sponsoring specific campaigns, or who are sponsoring hosting of the driver performance ranking website. The advertising can be a mixture of those different types, and other types of advertising.

Exemplary System Environment

FIG. 18 is a functional block diagram of an exemplary system employed to implement some of the concepts disclosed herein. The functional block diagram illustrates exemplary components used in vehicles 128 that are enrolled in a vehicle/driver performance monitoring service, to implement some of the method steps discussed above. An exemplary vehicle/driver performance monitoring service is based on adding an optional data buffer 136 (or other short-term memory storage) and a bi-directional data link 134 to each enrolled vehicle (in an exemplary, but not limiting embodiment, the data buffer and data link are combined into a single component). It should be understood that the short-term memory storage is not required for embodiments where the performance data transmitted from the enrolled vehicle does not include operational, vehicle, or driver related data that must be briefly stored. In an exemplary embodiment, the data link is a combination radio frequency (RF) transmitter and receiver, although separate transmitters and receivers could be used (note the term RF specifically encompasses cellular telephone based data links). A data terminal can optionally be included in the vehicle to facilitate operator entry of information and operator transmission of information that is presented to the operator on a display within the vehicle. Data collected on a portable data collection device during an inspection can also be uploaded through such a data terminal, or independently by direct transmission to the remote monitoring service. While RF data transmission represents an exemplary embodiment, other types of data transmission could be employed. If the vehicle does not already include performance data/operational data collecting components 130, such components are added. Most vehicles manufactured today include operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 132 that performs the function of managing the transmission of performance data from the vehicle to the remote monitoring service, according to one or more of the transmission paradigms discussed herein. In embodiments where the performance data includes temporary storage of operational data, the processor also implements the function of temporarily storing operational data from components 130 in data buffer 136 or other temporary storage, and using bi-directional data link 134 to convey real-time performance data and/or the buffered operational/performance data from the enrolled vehicle to a remote computing device 140 (which is used to analyze the performance of the vehicle and/or driver). It should be understood that those processor functions can be implemented by a single processor, or distributed across multiple processors.

In some embodiments, an output 138 is also included, to provide information to the driver in a form that can be easily understood by the driver. Output 138 can be implemented using a speaker providing an audible output, and using a display providing a visual output. Note that output 138 can be combined into a single component with the data buffer and the data link, so only a single additional component is added to the vehicle (recognizing that most vehicles already include the additional required components, such as the operational data collecting components and the processor).

While not specifically shown in FIG. 18, in particularly preferred embodiments the vehicle is equipped with a GPS unit (exemplary GPS units are illustrated in FIGS. 6 and 20). In a related preferred embodiment the processor, the GPS component, any buffer, and data link are combined into a single telematics device. Such a device will send GPS and vehicle/driver performance data to the remote computing device discussed below at a plurality of different times during the course of the operation of the vehicle. In general, the telematics device will transmit data at intervals ranging from as frequently as once every 5 to 15 seconds, or as rarely as once every 5 minutes, recognizing that such intervals can vary, and are intended to be exemplary, and not limiting.

As indicated in FIG. 18, remote computing device 140 (operated by the monitoring service) is logically coupled via a network 142 (such as the Internet) to a computing device 144 (such as a personal computer, tablet, or smart phone) accessible to a driver (in embodiments where driver performance rankings are shared with drivers, noting only one such driver device is shown in the Figure; however, the monitoring service will likely be monitoring the performance of a plurality of drivers, each likely having access to a different computing device 144), and a remote computing device 146 accessible to a vehicle operator (noting that in at least some embodiments, the monitoring service performs the monitoring function for a plurality of different vehicle operators/fleets). Network 142 facilitates communication between computing devices 140, 144, and 146, enabling the monitoring service to efficiently communicate with drivers and vehicle operators. It should be noted that the concepts disclosed herein encompass embodiments where the monitoring service and vehicle operator are the same entity.

The concepts disclosed herein are in at least some embodiments intended to be used by fleet owners operating multiple vehicles, and the performance data conveyed to the remote location for diagnosis will include an ID component that enables each enrolled vehicle to be uniquely identified.

Exemplary Computing Environment

FIG. 19 is a functional block diagram of an exemplary computing device that can be employed to implement some of the method steps disclosed herein. It should be understood that the concepts disclosed herein encompass processing of data collected at a vehicle both in the vehicle and at a remote computing device.

FIG. 19 schematically illustrates an exemplary computing system 250 suitable for use in implementing the processing functions disclosed herein. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of performance data (and in some embodiments, of position data) collected from enrolled vehicles, to identify mechanical faults in the enrolled vehicles. The machine instructions implement functions generally consistent with those described above. CPUs suitable for this purpose are available, for example, from Intel Corporation, AMD Corporation, Motorola Corporation, and other sources, as will be well-known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle performance data over time to detect a mechanical fault). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. In embodiments where computing system 250 is implemented in a vehicle, the computing system 250 can be configured to run autonomously, such that a user input device not regularly employed.

Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. In embodiments where computing system 250 is implemented in a vehicle, the computing system 250 can be vehicle performance data (and position data when desired) collected in connection with operation of enrolled vehicles to configured to run autonomously, such that a user output device not regularly employed.

Data link 264 is configured to enable data to be input into computing system 250 for processing. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

Note that vehicle/driver performance data from the enrolled vehicles will be communicated wirelessly in at least some embodiments, either directly to the remote computing system that analyzes the data to evaluate the driver's performance, or to some storage location or other computing system that is linked to computing system 250.

It should be understood that the term "remote computer" and the term "remote computing device" are intended to encompass a single computer as well as networked computers, including servers and clients, in private networks or as part of the Internet. The vehicle/driver performance data received by the monitoring service from the vehicle can be stored by one element in such a network, retrieved for review by another element in the network, and analyzed by yet another element in the network. While implementation of the method noted above has been discussed in terms of execution of machine instructions by a processor (i.e., the computing device implementing machine instructions to implement the specific functions noted above), the method could also be implemented using a custom circuit (such as an application specific integrated circuit or ASIC).

The concepts disclosed herein encompass collecting data from a vehicle during operation of the vehicle. The data collected is used to analyze the performance of at least one of the driver and the vehicle. In preferred embodiments, the data is collected during operation of the vehicle and wirelessly transmitted from the vehicle during its operation to a remote computing device using a cellular phone network based data link. The frequency of such data transmissions can be varied significantly. In general, more data is better, but data transmission is not free, so there is a tension between cost and performance that is subject to variation based on an end user's needs and desires (some users will be willing to pay for more data, while other users will want to minimize data costs by limiting the quantity of data being transferred, even if that results in a somewhat lower quality data set). The artisan of skill will be able to readily determine a degree to which data quality can be reduced while still provide useful data set.

Exemplary GPS Device with Onboard Computing Environment

FIG. 20 is a functional block diagram of an exemplary telematics device added to an enrolled vehicle to implement one or more of the methods of FIGS. 1, 2, 7, 8 and 10.

An exemplary telematics unit 160 includes a controller 162, a wireless data link component 164 (an RF data link being exemplary, but not limiting), a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. The exemplary data set discussed above in connection with calculated loaded cost per mile can also be employed. These data transmission can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164. If desired, additional memory can be included to temporarily store data id the RF component cannot transfer data. In particularly preferred embodiments the RF components is GSM or cellular technology based.

In at least one embodiment, the controller is configured to implement the method of FIG. 1 by using one or more of data collected from GPS 170 and data from input 168. In a related embodiment, the controller is configured to implement the method of FIG. 2 by using one or more of data collected from GPS 170 and data from input 168. In yet another related embodiment, the controller is configured to implement steps of the method of FIG. 7.

In another embodiment, the controller is configured to implement steps of the method of FIG. 8. Once the vehicle mass has been determined, that data can be added to GPS data that is transmitted to a remote computing device. In a related embodiment, input 168 is bi-directional, and the vehicle mass is output from the telematics device onto a vehicle data bus, and can be used by an ECU to control vehicle operations. ECUs have been developed to use estimates of vehicle mass to control engine speed and transmission shifting, however, those estimates of vehicle mass have not been based on GPS derived slope data, and as such those prior art vehicle mass estimations have been less accurate than the vehicle mass calculations based on GPS derived slope data as disclosed herein.

Newly Disclosed Subject Matter

FIG. 21 is a functional block diagram of an exemplary vehicle components employed to implement the ECU reprogramming (in response to current operational data inputs) concepts disclosed herein.

FIG. 21 shows a vehicle 180 that includes a vehicle ECU 182, a controller 184, a memory 186 (i.e., ECU Program Storage), an input 188, and a data link 190. As will be discussed below, certain of these components (such as the data link, the input, and the memory) can be omitted in various embodiments.

It should be understood that vehicle 180 can include more than one ECU 182 whose programming can be changed to enhance the efficiency of the vehicle operation. In most cases, enhanced efficiency means better fuel efficiency, although it should be recognized that in certain applications other factors, such as available horsepower, load rating, shift patterns (logic determining under what conditions an automatic transmission will change gears) RPM settings, and/or speed settings can be changed by changing the ECU programming to suit current conditions. So while the concepts disclosed herein can be used to modify ECU programming based on current operating conditions to improve fuel efficiency, the concepts disclosed herein can also be used to optimize performance based on some other parameter than fuel efficiency. It should be understood that the concepts disclosed herein can be applied to change ECU programming on more than one ECU in a vehicle. Furthermore, it should be understood that certain conditions might trigger multiple ECU reprogramming. For example, the detection of a certain predefined condition could trigger ECU programming changes that modify one or more of fuel flow settings, RPM settings, and transmission shift patterns, noting that such parameters are exemplary and not limiting.

In at least one embodiment, the ECU reprogramming includes modifying a fuel map.

Controller 184 is tasked with comparing the current operating conditions with the current ECU programming, and determining if the ECU programming should be changed to optimize vehicle performance (according to some predetermined characteristic, such as max fuel efficiency, max power, etc.). Controller 184 can implemented by a general purpose computing device executing machine instructions to implement such a task, or by a custom circuit designed to implement the specific function. In general, controller 184 is located at the vehicle, although it should be recognized that if controller 184 is logically coupled to a data link at the vehicle, and the data link is logically coupled to ECU 182 (or a vehicle data bus coupled to the vehicle ECU), that controller 184 can be disposed at a location remote from the vehicle.

In embodiments where controller 184 is remote from the vehicle, input 188 can be at the vehicle, and coupled to the data link in the vehicle communicating with controller 184. Alternatively, where controller 184 is remote from the vehicle, a non-vehicle based input can be used by a dispatcher/operator remote from the vehicle to provide input to controller 184.

Controller 184 can select a different ECU programming set based on empirical data indicating that a particular programming set is preferred based on specific operating conditions, or based on a user knowledge base that suggests that a certain programming set is more appropriate for certain operating conditions (such suppositions based on user knowledge may or may not have been confirmed with empirical data).

In at least one embodiment, controller 184 of FIG. 21 and controller 162 of FIG. 20 are the same controller. In at least one embodiment, controller 184 of FIG. 21 is part of a portable computing device used at the vehicle. Such a portable computing device can be logically coupled to ECU 182 via a wired or wireless data link.

Memory 186 includes a plurality of different ECU programming sets, each of which can be selected to optimize certain vehicle performance characteristics (such as fuel efficiency, speed settings, engine RPM settings, available power settings, etc.) according to current operating conditions at the vehicle (it should also be understood that the concepts disclosed herein will enable operators to specifically select particular programming sets, irrespective of current conditions). Further, it should be understood that current operating conditions can be based on current sensor data, as well as a specific input before such sensor data is collected (such specific inputs can include a specific route the vehicle will be following, or a particular load the vehicle will be carrying).

In general, memory 186 is located at the vehicle, although it should be recognized that if memory 186 is logically coupled to a data link at the vehicle, and the data link is logically coupled to controller 184 at the vehicle, that memory 186 can be disposed at a location remote from the vehicle. Further, if controller 184 is located at a remote location, memory 186 need not be at the vehicle, but at some location where controller 184 can access memory 186.

Input 188 represents an input device at the vehicle, which is used to convey one or more data inputs to controller 184. In some embodiments, input 188 is a sensor disposed at the vehicle, which detects an ambient condition, so that controller 184 can determine if the current ECU programming is appropriate for the current conditions. Exemplary sensors include temperature sensors, GPS devices (including GPS devices that are configured to provide GPS derived slope data and vehicle mass data, generally as discussed above), speed sensors, inclinometers, weight sensors, oil pressure sensors, oil temperature sensors, coolant temperature sensors, tire temperature sensors, and tire pressure sensors. It should be recognized that the concepts disclosed herein encompass the use of only a single sensor input, as well as embodiments wherein controller 184 receives multiple different sensors inputs, and selects an ECU programming set based on multiple sensor inputs. In such an embodiment, controller 184 can be configured to assign different priorities to different sensor inputs.

In at least one embodiment, input 188 is a controller or processor in the vehicle that detects a condition, and conveys an indication of that condition to controller 184. For example, a processor in the vehicle might detect that the vehicle is idling, and may be likely to continue idling for an extended period, such that controller 184 modifies ECU programming to reduce fuel consumption during a period of extended idle conditions. One technique for detecting or predicting extended idle conditions is based on historical data (vehicle regularly idles at the same time or location), as well as using location data (i.e., a terminal or loading facility where a vehicle might logically idle while waiting to be loaded). Furthermore, if a processor detects that a vehicle is in neutral or park, and running for more than 90 seconds (or some other predetermined period of time), that processor could indicate to controller 184 that an idle state has been entered. Another technique for detecting an idle condition is determining if a PTO unit has been active. Activation of such a unit often indicates that the engine is being used to drive the PTO rather than for over the road operation, such that different ECU programming sets can be implemented to reduce fuel consumption (as PTO units generally require much less horsepower than over the road travel).

In at least one embodiment, input 188 is (or is logically coupled to) a PTO, such that activation of the PTO triggers a change in ECU programming. As noted above, PTO units generally require much less horsepower than over the road travel.

In at least one embodiment, input 188 is a user interface that a vehicle operator can use to either convey an indication of a specific condition to controller 184, or to specifically request a particular ECU programming change. In at least one embodiment, the vehicle operator uses input 188 to tell controller 184 that the vehicle will be entering an extended idle state (for example, due to traffic conditions, loading wait times, PTO use, or some other condition that requires the driver keep the vehicle running but not moving, or moving at very low speeds). Controller 184 can then respond by selecting ECU programming that reduces available horsepower but maximized fuel efficiency.

In at least one embodiment, the vehicle operator uses input 188 to tell controller 184 that the vehicle will be entering a jurisdiction or region where a different max speed setting needs to be implemented. Controller 184 can then respond by selecting ECU programming that matches the speed setting to the jurisdiction or region selected by the driver.

In one exemplary embodiment, the vehicle operator enters into a business relationship with a third party. The third party modifies a vehicle as indicated in FIG. 21 (noting that one or more of the elements shown in FIG. 21 can be implemented remotely, and not all elements are required in all implementations). The vehicle operator will contact the third party when an ECU programming change is required. The third party will then instruct controller 184 to execute the programming change. While such a business model can be implemented for any of the ECU programming changes disclosed herein, it should be noted that ECU programming changes based on different speed settings for different jurisdictions represents a particularly interesting business opportunity. Currently, Canadian rules require trucks operating in Canada to have different speed settings than trucks operating in the US. When a truck with speed settings configured for US operation enters Canada, drivers must take their vehicle to a repair facility for manual ECU reprogramming by a technician. Such visits to repair facilities are time consuming and costly. In the business arrangement noted above, the third party can implement such a programming change much more efficiently, saving the truck operator time and money. Such a business model can be an enhancement to vehicle monitoring services already offered by the third party.

In at least one embodiment, the vehicle operator uses input 188 to tell controller 184 that the vehicle will be entering an uphill segment of a route (generally this will be implemented where the uphill segment is relatively long, as there may be minimal benefit to implementing an ECU programming change for a shorter segment). Controller 184 can then respond by selecting ECU programming that is more suited to larger horsepower requirements for uphill travel.

In at least one embodiment, the vehicle operator uses input 188 to tell controller 184 that the vehicle will be entering a downhill segment of a route (generally this will be implemented where the downhill segment is relatively long, as there may be minimal benefit to implementing an ECU programming change for a shorter segment). Controller 184 can then respond by selecting ECU programming that is more suited to reduced horsepower requirements for downhill travel (or increased braking, or a change in shift patterns more suited to downhill travel).

In at least one embodiment, the vehicle operator uses input 188 to tell controller 184 the current load conditions for the vehicle (for example, a weight of the material loaded onto the vehicle). Controller 184 can then respond by selecting ECU programming that is more suited to the current load.

In at least one embodiment, the vehicle operator uses input 188 to tell controller 184 the specific route for the vehicle). Controller 184 can then respond by selecting ECU programming that is more suited to that route. In some embodiments, the controller is coupled to a GPS unit, so that different ECU parameters can be implemented for different portions of the route. Vehicle operators that continually traverse the same route under similar load conditions can perform empirical studies to determine optimal ECU programming patters for different portions of that route.

In at least one embodiment, the vehicle operator uses input 188 to tell controller 184 the current road conditions (for example, elevation, night time operation, day time operation, heavy traffic conditions, the presence of snow or ice, relatively cold ambient temperatures, or relatively hot ambient temperatures). Controller 184 can then respond by selecting ECU programming that is more suited to the current road conditions. As discussed above, empirical data or user knowledge can be used to determine which ECU programming sets are most suited to certain conditions.

In at least one embodiment, the vehicle operator uses input 188 to tell controller 184 the identity of the current operator. Controller 184 can then respond by selecting ECU programming that is more suited to the skill set of the current driver. For example, fleet operators may understand that relatively less experienced drivers are less able to operate vehicles at peak fuel efficiency, and certain ECU programming can be used to manage their relative inefficiencies. More experienced drivers may be able to achieve better fuel efficiency with different ECU programming. As discussed above, empirical data or user knowledge can be used to determine which ECU programming sets are most suited to certain drivers.

Data link 190 can be used in lieu of or in addition to input 188 as a mechanism to provide data input to controller 184, to prompt controller 184 to review current ECU programming in light of the data input in order to determine if ECU programming should be changed (it should be understood that the concepts disclosed herein also encompass embodiments in which the data input is actually an instruction to change the ECU programming, such that to controller 184 does not need to analyze the input to determine if a change is required, but simply executes the instructed ECU programming change).

In embodiments wherein controller 184 is disposed at the vehicle, data link 190 can be used to send data acquired remotely to controller 184. In embodiments wherein controller 184 is disposed remote from the vehicle (not separately shown), a similar data link at the vehicle can be logically coupled to ECU 182, so that controller 184 can reprogram the ECU remotely.

In at least one embodiment, data link 190 receives input from a controller or processor remote from the vehicle that detects a condition, and conveys an indication of that condition to controller 184 via the data link. For example, a processor remote from the vehicle might detect that the vehicle is idling, and may be likely to continue idling for an extended period, such that controller 184 modifies ECU programming to reduce fuel consumption during a period of extended idle conditions. One technique for detecting or predicting extended idle conditions is based on historical data (GPS data acquired from the vehicle and sent to the remote processor indicates the vehicle is currently at a location that past data indicates is associated with extended idle conditions, or time records available to the remote processor indicates the vehicle regularly idles at a particular point in time. Furthermore, if the remote processor (using data conveyed from the vehicle) detects that a vehicle is in neutral or park, and running for more than 90 seconds (or some other periods of time), that processor could indicate to controller 184 that an idle state has been entered. Another technique for detecting an idle condition is determining if a PTO unit has been active (again, using data conveyed from the vehicle to the remote processor). Activation of such a unit often indicates that the engine is being used to drive the PTO rather than for over the road operation, such that different ECU programming sets can be implemented to reduce fuel consumption (as PTO units generally require much less horsepower than over the road travel). It might seem that sending data from the vehicle to a remote processor, which analyzes the data to detect conditions that may indicate ECU programming changes should be implemented is based on data transfer that could be eliminated by having the processor detecting the condition at the vehicle. While that is true, collecting data from a vehicle and conveying that data to a remote site for storage and analysis is a legitimate business model; and such data transmission already occurs. Performing analysis remote from the vehicle reduces the computational load at the vehicle, so if the data is already being sent from the vehicle to a remote server, processing the data remotely is a functional alternative to analyzing data at the vehicle. Such offsite processing is also useful in embodiments where controller 184 is located remote from the vehicle.

In at least one embodiment, data link 190 receives input from a weather service that provides weather information for the vehicles general location. Controller 184 can then determine if current ECU programming matches the weather conditions from the weather service, and if not, controller 184 selects more appropriate ECU programming sets and reprograms the ECU.

In at least one embodiment, data link 190 receives input from a user interface disposed remote from the vehicle that a dispatcher can use to either convey an indication of a specific condition to controller 184, or to specifically request a particular ECU programming change. In at least one embodiment, the dispatcher uses the remote input device and data link 190 to tell controller 184 that the vehicle will be entering a jurisdiction or region where a different max speed setting needs to be implemented. Controller 184 can then respond by selecting ECU programming that matches the speed setting to the jurisdiction or region selected by the driver.

In at least one embodiment, data link 190 receives input from a user interface disposed remote from the vehicle that a dispatcher can use to tell controller 184 the current load conditions for the vehicle (for example, a weight of the material loaded onto the vehicle). Dispatchers will often have access to that information even though they are remote from the vehicle. Controller 184 can then respond by selecting ECU programming that is more suited to the current load.

In at least one embodiment, data link 190 receives input from a user interface disposed remote from the vehicle that a dispatcher can use to tell controller 184 the specific route for the vehicle. Controller 184 can then respond by selecting ECU programming that is more suited to that route. In some embodiments, the controller is coupled to a GPS unit, so that different ECU parameters can be implemented for different portions of the route. Vehicle operators that continually traverse the same route under similar load conditions can perform empirical studies to determine optimal ECU programming patters for different portions of that route.

In at least one embodiment, data link 190 receives input from a user interface disposed remote from the vehicle that a dispatcher can use tell controller 184 the identity of the current operator (dispatchers often have access to driver data even though they are remote from the vehicle). Controller 184 can then respond by selecting ECU programming that is more suited to the skill set of the current driver. For example, fleet operators may understand that relatively less experienced drivers are less able to operate vehicles at peak fuel efficiency, and certain ECU programming can be used to manage their relative inefficiencies. More experienced drivers may be able to achieve better fuel efficiency with different ECU programming. As discussed above, empirical data or user knowledge can be used to determine which ECU programming sets are most suited to certain drivers.

FIG. 22 is a flow chart showing exemplary method steps implemented according to one aspect of the concepts disclosed herein, in which vehicle ECU programming is modified in response to one or more current vehicle operational data inputs.

In a block 190, input data is conveyed to a processor tasked with evaluating ECU programming in light of the input data. In some embodiments, the processor is located at the vehicle, while in other embodiments the processor is spaced apart from the vehicle, and is logically coupled to the vehicle ECU (or a data bus coupled to the ECU) via a wireless data link.

In a block 192, the processor tasked with evaluating current ECU programming in light of the input data determines if more efficient ECU programming sets exist. If not, the logic loops back to block 190. If in block 192 it is determined that a better ECU programming set exists, then in a block 194 the current ECU programming is replaced with the more efficient ECU programming (based on the input from block 190).

As noted above, either empirical data or user knowledge can be used to assign specific ECU programming sets to specific conditions/inputs. Thus in block 192 the processor simply matches the available ECU programming sets to the input.

In an exemplary embodiment, block 192 is implemented using the following steps. A plurality of different ECU programming sets are provided. For each ECU programming set, the current vehicle operational data is used as an input, and based on those inputs at least one vehicle performance characteristic that would result in using that ECU programming set is determined in light of current vehicle operational data. Note that in some embodiments, the output of using the current vehicle operational data and a specific ECU programming set is a single vehicle performance characteristic (such as horsepower or fuel economy), while in other embodiments the output includes a plurality of different vehicle performance characteristics. The determination as to whether the output should include a single or multiple vehicle performance characteristics is based on what the vehicle operator hopes to achieve. In many embodiments, the vehicle operator will be hoping to achieve improved fuel economy, thus in at least some embodiments the only output will be an indication of what fuel economy will be achieved based on current vehicle operational data inputs and a particular set of ECU programming. Other vehicle operators may want to emphasize fuel economy, subject to certain other limitations involving factors such as speed, horsepower, or engine load. For example, max fuel economy under certain conditions might be achieved by using an unacceptably low vehicle speed. In other conditions, max fuel economy may result when placing an unacceptable (for that operator at least) load on the engine (which may lead to reduced service life), so engine load may be an output important to some users. The specific output (or outputs) will also be related to the parameters (or parameters) that are being optimized. Most users will not really want maximum fuel economy, because to achieve max fuel economy an unrealistically low vehicle speed will be required (thus, even when fuel economy is a parameter to be optimized, one really is seeking to determine which ECU programming set will deliver max fuel economy at current conditions while maintaining vehicle speed, engine load, and/or engine RPMs within certain ranges selected by the user, such parameters being exemplary, not limiting). While considering ECU programming sets in light of optimizing fuel economy will likely be important to many users, some users (such as racing car drivers) may want to compare different ECU programming sets in light of optimizing horsepower (other users might want to optimize torque, or top speed). Thus, the output will be related to some predetermined vehicle characteristic that one seeks to optimize.

Thus block 192 involves comparing the results from each ECU programming set based on current vehicle operating conditions to identify the ECU programming set that optimizes vehicle performance based on predetermined parameters. Then it is determined if the current ECU programming set is the ECU programming set that that optimizes vehicle performance based on the predetermined parameters. It should be understood that the functions of block 192 can be implemented by a processor implementing suitable machine instructions, or a custom circuit, FIG. 23 is a flow chart showing exemplary method steps implemented according to one aspect of the concepts disclosed herein, in which vehicle ECU programming is modified in response to a specific user request for a programming change.

In a block 196, a driver, a remote dispatcher, or processor determines that current ECU programming needs to be changed. Often such a change will be directed to changing speed limiting settings due to crossing a jurisdictional border, although changes for other purposes are encompassed by the concepts disclosed herein.

In a block 198, the current ECU programming set is changed as specified in block 196.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for analyzing the programming of a vehicle controller that controls at least one performance characteristic of a vehicle in light of current vehicle operating conditions, the system comprising:
（a) at least one vehicle operational data generating component;
(b) at least one processor, the at least one processor implementing the functions of:
(i) analyzing the vehicle operational data in real-time to determine if different programming would lead to improved performance; and (ii) changing the programming of the vehicle controller to improve the performance of the vehicle when such reprogramming would result in improved performance; and (c) an output device for alerting the driver to temporarily halt the vehicle so reprogramming can be implemented while the vehicle is at rest.

2. The system of claim 1, wherein the vehicle operational data includes a mass of the vehicle, where the mass is calculated by:

(a) determining a slope the vehicle is traveling over at a specific point in time based on the vehicle position data at that point in time; and (b) determining a mass of the vehicle at a specific point in time, based on the slope the vehicle is traveling over at that point in time, velocity data at that point in time, torque data at that point in time, and engine speed data at that point in time.

3. The system of claim 1, wherein the at least one processor further implements the function of determining if different programming would lead to a lower cost per loaded mile.

4. The system of claim 1, wherein the at least one processor further implements the function of determining if different programming would lead to an increase in fuel economy.

5. The system of claim 1, further comprising a non-transitory memory at the vehicle, logically coupled to the at least one processor which also is disposed at the vehicle, the memory including a plurality of different ECU programming sets; and wherein the at least one processor implements the function of analyzing the vehicle operational data in real-time by executing the following steps:

(a) for each ECU programming set, using the current vehicle operational data to determine at least one vehicle performance characteristic that would result in using that ECU programming set in light of current vehicle operational data;

(b) comparing the results from each ECU programming set to identify the ECU programming set that optimizes vehicle performance based on predetermined parameters; and (c) determining if the current ECU programming set is the ECU programming set that that optimizes vehicle performance based on the predetermined parameters.

6. The system of claim 5, wherein the non-transitory memory and the at least one processor are disposed at the vehicle.

7. The system of claim 1, wherein the at least one processor further implements the function of determining if different programming would lead to a decrease in engine load.

8. The system of claim 1, wherein the at least one processor is also used to determine slope and vehicle mass.

9. The system of claim 1, wherein the at least one processor is disposed at the vehicle.

10. The system of claim 1, wherein the at least one processor is disposed remote from the vehicle, and further comprising a cellular data link in the vehicle to convey the vehicle data to the at least one processor remote from the vehicle.

11. The system of claim 1, wherein the at least one processor further implements the function of determining if different programming would lead to an increase in horsepower.

12. The system of claim 1, further comprising a user interface component at the vehicle that is logically coupled to the at least one processor, and the at least one processor further implements the function of receiving an input from a driver of the vehicle, the input defining the aspect of vehicle performance to be optimized based on current vehicle operating conditions.

13. The system of claim 1, further comprising a wireless data link at the vehicle, the wireless data link being logically coupled to the at least one processor; and the at least one processor further implements the function of receiving an input from a user remote from the vehicle via the wireless data link, the input defining the aspect of vehicle performance to be optimized based on current vehicle operating conditions.

14. The system of claim 1, wherein the at least one processor is part of a telematics device.

15. The system of claim 14, wherein the telematics device comprises a position sensing component.

16. A non-transitory computer-readable medium having machine instructions stored thereon for remotely monitoring vehicle performance data, and determining if different ECU programming would result in improved performance, the machine instructions, when implemented by a processor, carrying out the functions of:

(a) analyzing the vehicle operational data in real-time to determine if different programming would lead to improved performance;

(b) when such reprogramming would result in improved performance, automatically using an output device to alert the driver to temporarily halt the vehicle so reprogramming can be implemented while the vehicle is at rest; and (c) changing the programming of the vehicle controller to improve the performance of the vehicle after the driver has halted the vehicle.

17. The non-transitory computer-readable medium of claim 16, furthering having machine instructions stored thereon for carrying the steps:

(a) for each of a plurality of ECU programming sets, using the current vehicle operational data to determine at least one vehicle performance characteristic that would result in using that ECU programming set in light of current vehicle operational data;

(b) comparing the results from each ECU programming set to identify the ECU programming set that optimizes vehicle performance based on predetermined parameters; and (c) determining if the current ECU programming set is the ECU programming set that that optimizes vehicle performance based on the predetermined parameters.

18. A method of changing a fuel map used to control vehicle performance in response to vehicle operating conditions, the method comprising the steps of:

(a) while the driver is operating the vehicle, automatically collecting vehicle operational data that can be used to evaluate the driver's performance;

(b) using a processor to analyze the vehicle operational data in real-time to determine if a different fuel map would lead to improved performance;

(c) if the analysis indicates that changing the fuel map would lead to improved performance, then automatically using an output device to alert the driver to temporarily halt the vehicle so reprogramming can be implemented while the vehicle is at rest; and (d) changing the fuel map used by a vehicle controller to improve the performance of the vehicle after the driver has halted the vehicle.

19. The method of claim 18, wherein the processor is remote from the vehicle.

* * * * *